United States Patent [19]
Miyazaki et al.

[11] Patent Number: 5,883,676
[45] Date of Patent: Mar. 16, 1999

[54] IMAGE SIGNAL OUTPUTTING APPARATUS

[75] Inventors: Yoshiyuki Miyazaki, Higashiosaka; Tadashi Amino, Kobe, both of Japan

[73] Assignee: Sanyo Electric Company, Ltd., Osaka, Japan

[21] Appl. No.: 562,875

[22] Filed: Nov. 27, 1995

[30] Foreign Application Priority Data

Nov. 28, 1994 [JP] Japan ................................. 6-292638
Nov. 29, 1994 [JP] Japan ................................. 6-294127

[51] Int. Cl.⁶ ................................................. H04N 5/445
[52] U.S. Cl. ............................ 348/567; 348/564; 348/565
[58] Field of Search ................................. 348/564, 565, 348/567, 513, 514, 584, 588, 715, 716, 718

[56] References Cited

U.S. PATENT DOCUMENTS

| | | | |
|---|---|---|---|
| 4,266,242 | 5/1981 | McCoy | 348/567 |
| 4,862,269 | 8/1989 | Sonoda et al. | 348/564 |
| 5,043,825 | 8/1991 | Heitmann et al. | 386/7 |
| 5,394,535 | 2/1995 | Ohuchi | 395/425 |
| 5,517,253 | 5/1996 | De Lange | 348/514 |
| 5,572,235 | 11/1996 | Mical et al. | 345/150 |

*Primary Examiner*—John K. Peng
*Assistant Examiner*—Linus Lo
*Attorney, Agent, or Firm*—Armstrong, Westerman, Hattori, McLeland & Naughton

[57] ABSTRACT

A video signal outputting apparatus includes an A/D converter, and video signals Y1-1 and Y3-1 outputted from the A/D converter are written into areas C1 and C3 of a VRAM, and therefore, images according to the video signals are displayed on a monitor. Then, video signals Y1-2 and Y3-2 are outputted from the A/D converter, and written into an area C5 of a further VRAM and the area C1 of the VRAM, respectively. Images according to the video signals Y1-2 and Y3-1 are displayed on the monitor at a timing that writing of the video signal Y1-2 is finished, and images according to the video signals Y1-2 and Y3-2 are displayed at a timing that writing of the video signal Y3-2 is finished.

6 Claims, 39 Drawing Sheets

FIG. 2
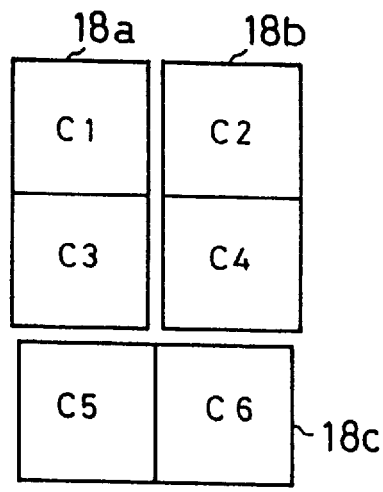
FIG. 3
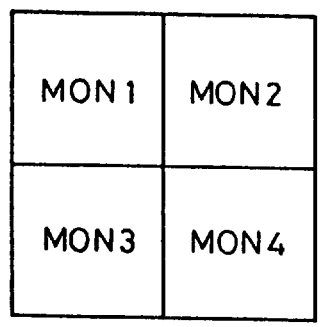
FIG. 4
| MEMORY AREA | INPUT TERMINAL INFORMATION | FLAG |
|---|---|---|
| C1 | | |
| C2 | | |
| C3 | | |
| C4 | | |
| C5 | | |
| C6 | | |

F I G. 12
(A)
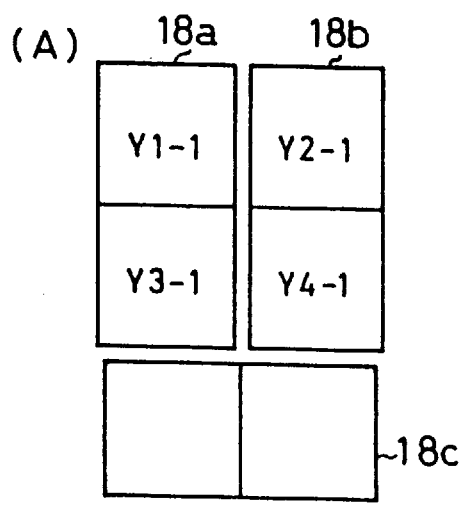
F I G. 13
(A)
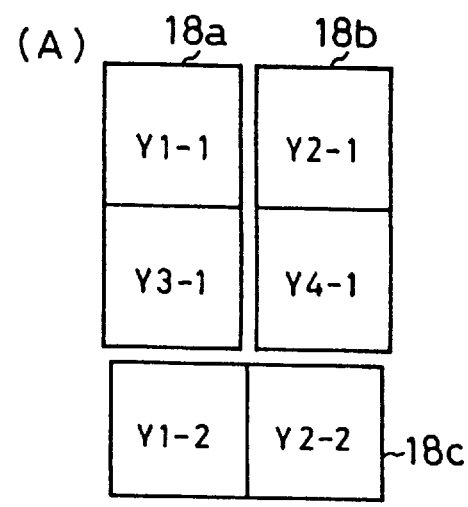
(B)
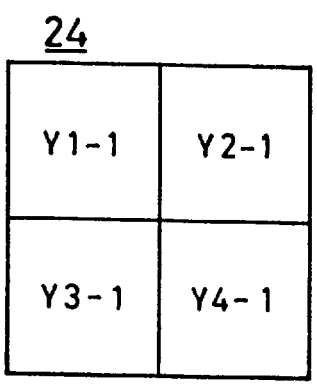
(B)
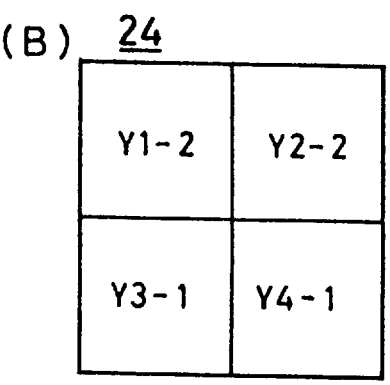

FIG. 14
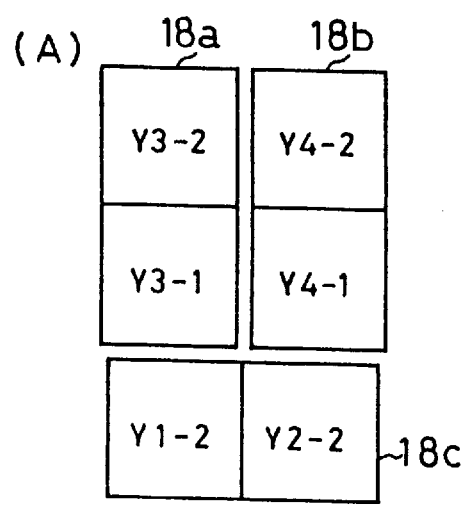
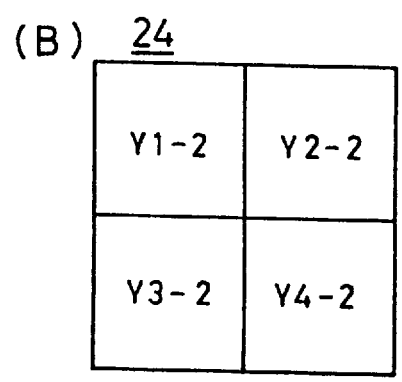

| AREA | INPUT TERMINAL INFORMATION | WRITE FLAG | FIELD FLAG |
|---|---|---|---|
| Y 1 | 0 0 0 0 | | |
| Y 2 | 0 0 0 1 | | |
| Y 3 | 0 0 1 0 | | |
| Y 4 | 0 0 1 1 | | |
| Y 5 | 0 1 0 0 | | |
| Y 6 | 0 1 0 1 | | |
| Y 7 | 0 1 1 0 | | |
| Y 8 | 0 1 1 1 | | |
| Y 9 | 1 0 0 0 | | |
| Y10 | 1 0 0 1 | | |
| Y11 | 1 0 1 0 | | |
| Y12 | 1 0 1 1 | | |
| Y13 | 1 1 0 0 | | |
| Y14 | 1 1 0 1 | | |
| Y15 | 1 1 1 0 | | |
| Y16 | 1 1 1 1 | | |

F I G. 22
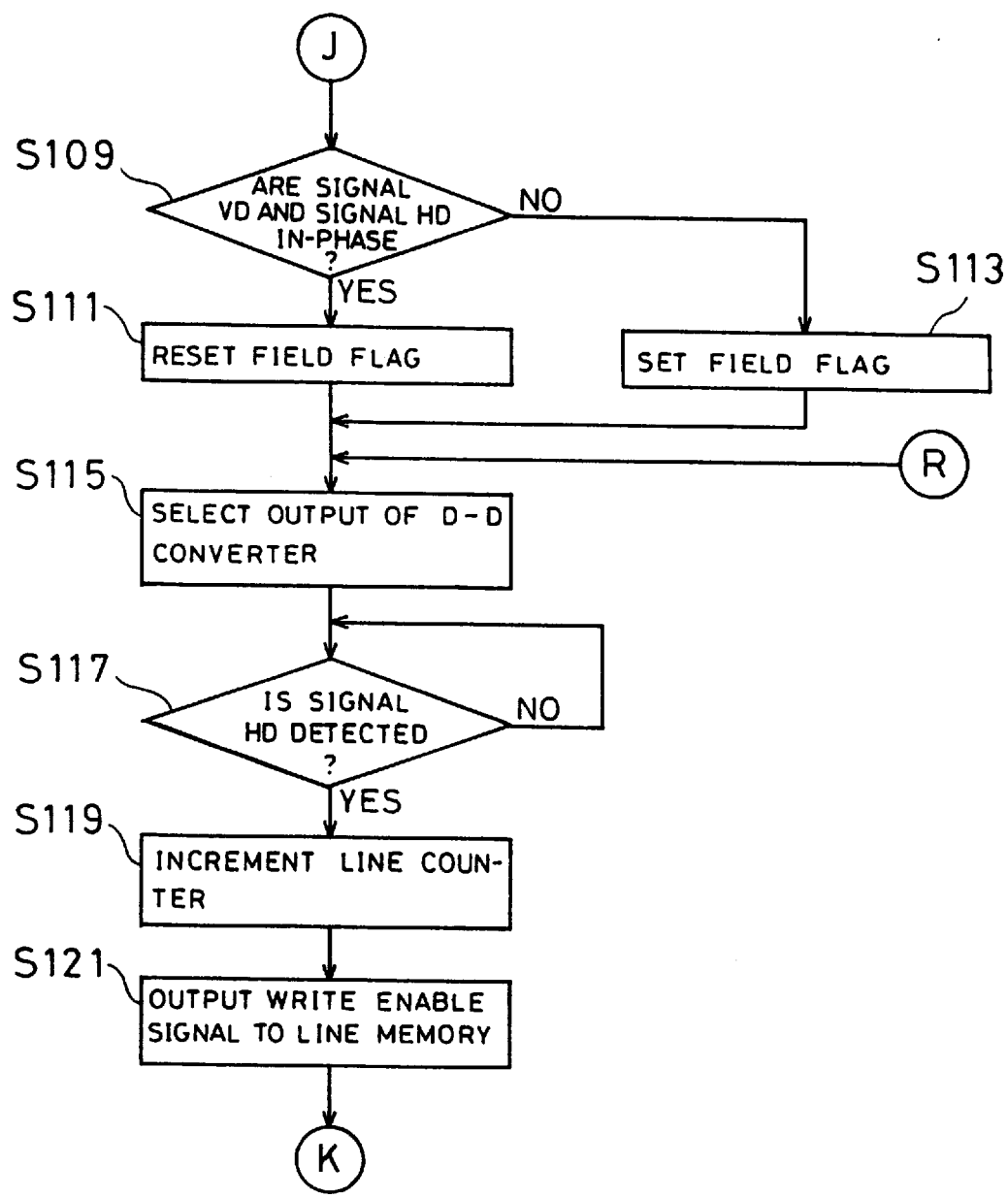

F I G. 23
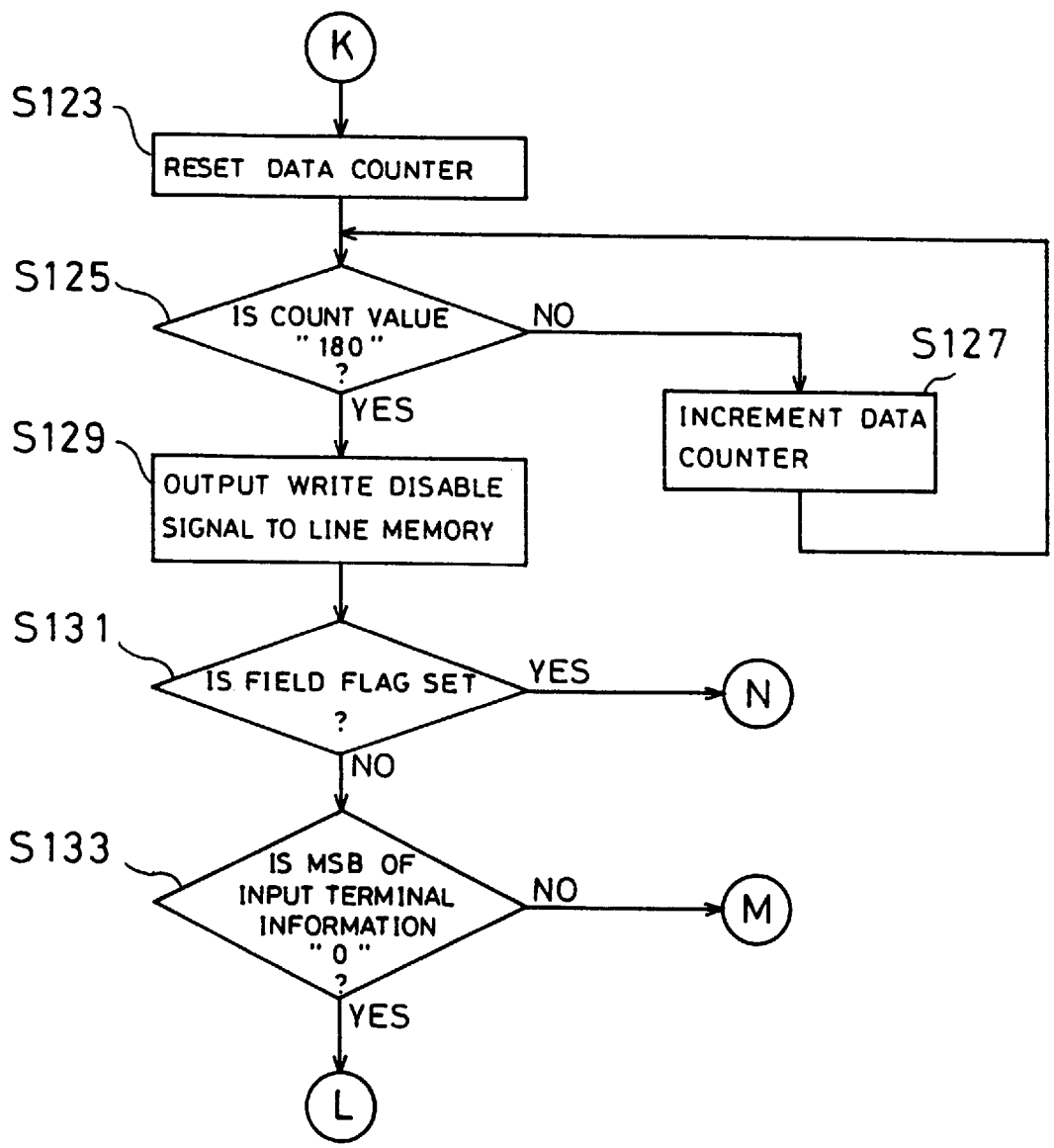

F I G. 26
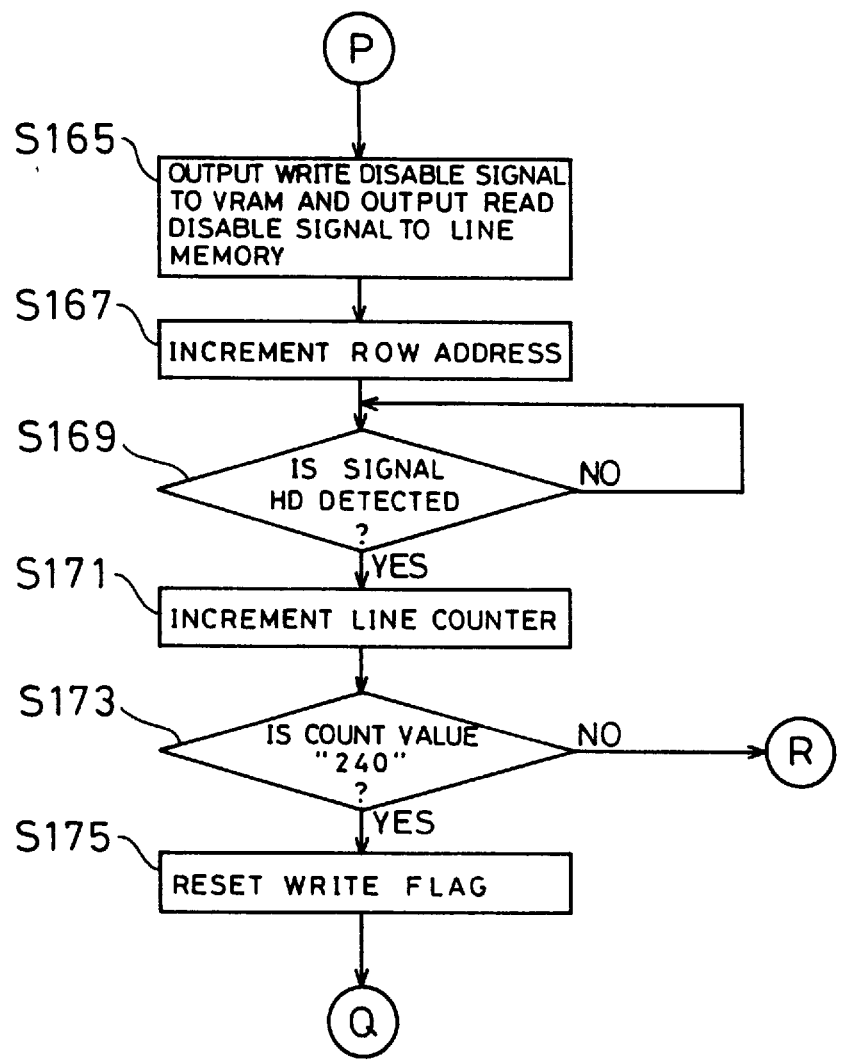

F I G. 27
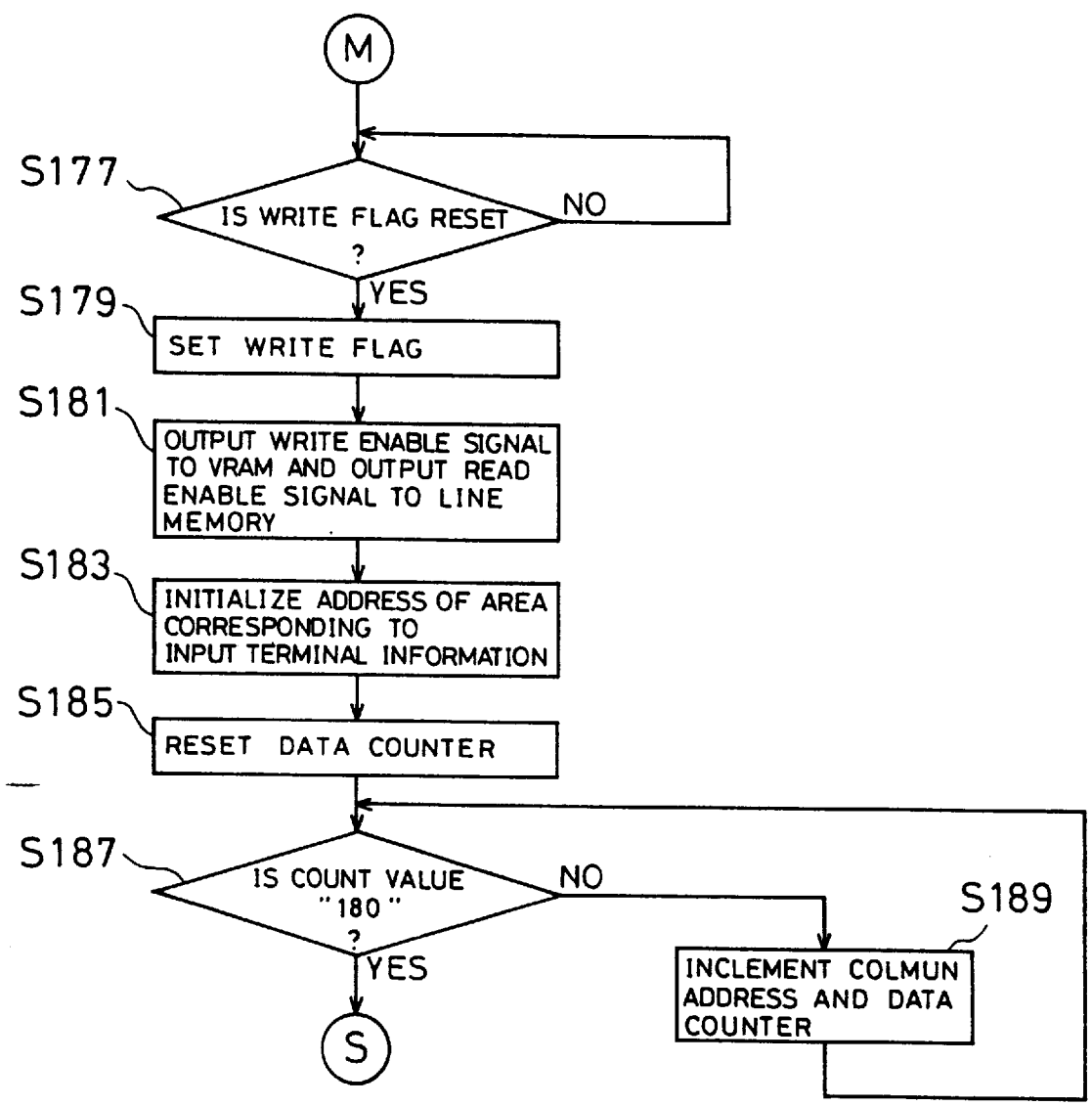

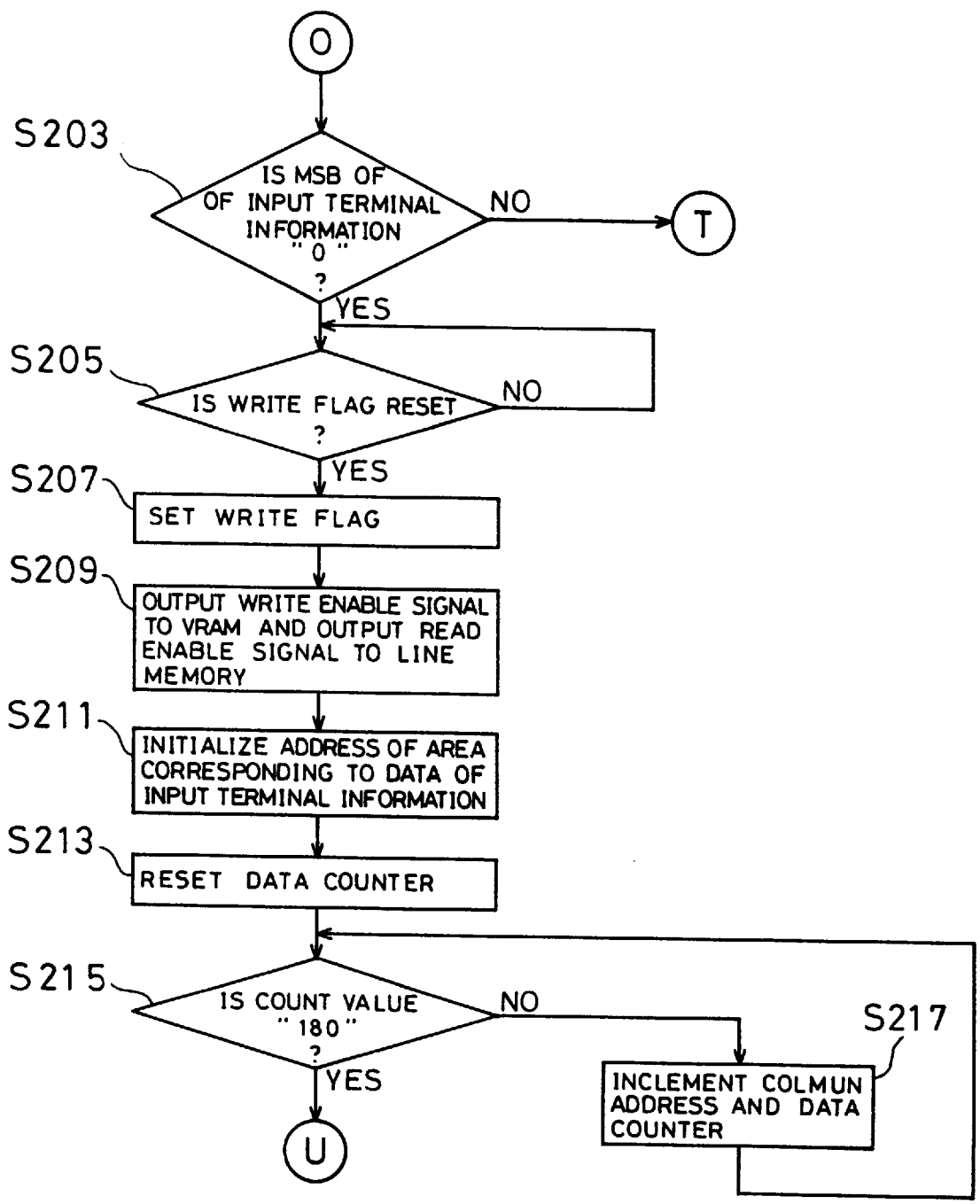
F I G. 29

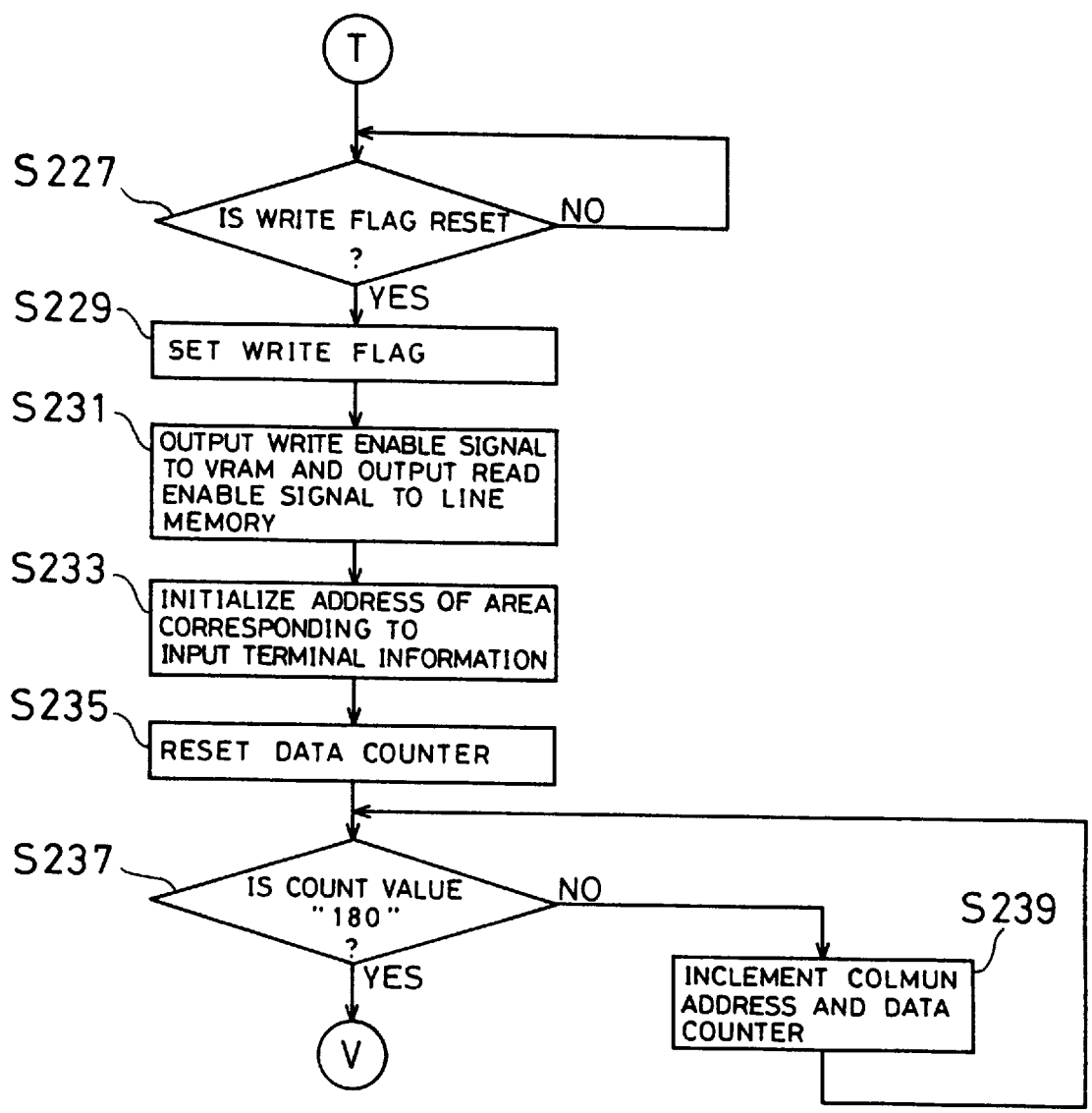
F I G. 31

IMAGE SIGNAL OUTPUTTING APPARATUS

BACKGROUND OF THE INVENTION

1. Field of the Invention

The present invention relates to an image or video signal outputting apparatus. More specifically, the present invention relates to a video signal outputting apparatus which outputs N kinds of video signals to N of display means, respectively, like a time laps VCR.

2. Description of the Prior Art

One example of conventional such a kind of video signal outputting apparatus 1 applied for a time lapse VCR which outputs 4 kinds of video signals from a monitor by dividing a screen into 4 blocks is shown in FIG. 38. In this video signal outputting apparatus 1, video signals Y1 and Y3 outputted from an A/D converter 2a are written into a VRAM 4a in response to a write control signal from a microcomputer 3, and video signals Y2 and Y4 outputted from an A/D converter 2b are written into a VRAM 4b by the write control signal from the microcomputer 3. More specifically, the video signals Y1 and Y3 are written into areas A1 and A3 of the VRAM 4a shown in FIG. 39, respectively, and the video signals Y2 and Y4 are written into areas A2 and A4 of the VRAM 4b, respectively. Then, addresses of the VRAM 4a and 4b are scanned downward as shown in FIG. 40 such that the video signals Y1 to Y4 are read-out and outputted through a multiplexer 5 and a D/A converter 6. Therefore, images according to the video signal Y1 to Y4 are displayed on a monitor 7 as shown in FIG. 41.

Furthermore, in another example of conventional such a kind of video signal outputting apparatus 1 as shown in FIG. 42, video signals Y1 to Y4 outputted from an A/D converter 2a are sequentially written into areas A1 to A4 of VRAMs 4a and 4b, and video signals Y1 to Y4 outputted from an A/D converter 2b are sequentially written into areas B1 to B4 of VRAMs 4c and 4d. Since a microcomputer 3 switches write signals for the VRAMs 4a and 4b and write signals for the VRAMs 4c and 4d at every one field, video signals Y1-1 to Y4-1 outputted at a last time are written into the VRAMs 4a and 4b, and video signals Y1-2 to Y4-2 outputted at a present time are written into the VRAMs 4c and 4d, as shown in FIG. 43(B). Furthermore, a video signal Y1-3 outputted at a next time from the A/D converter 2a is written into the area A1 as shown in FIG. 43(C).

Thus, a newest video signal out of the video signals written into the VRAMs 4a to 4d is applied to a monitor 7. Accordingly, when the video signals are stored in the VRAMs 4a to 4d as shown in FIG. 43(B), images according to the video signals Y1-2 to Y4-2 in the VRAMs 4c and 4d are displayed on the monitor 7 as shown in FIG. 44(A). Then, during a time that an video signal Y1-3 is being written as shown in FIG. 43(C), the images shown in FIG. 44(A) are displayed on the monitor 7, and when writing of the video signal Y1-3 is completed, images according to the video signals Y1-3, Y2-2, Y3-2 and Y4-2 are displayed as shown in FIG. 44(B).

However, in the prior art shown in FIG. 38, a writing speed and a reading speed of the video signal are different from each other as shown in FIG. 45. Accordingly, in a case where reading is started while the video signal Y3-2 is being written in the area A3 as shown in, for example, FIG. 46, the last video signal Y3-1 and the present video signal Y3-2 are outputted on the monitor 7 as shown in FIG. 47, and therefore, there was a problem that the images are incoincident with each other at an upper side and a lower side of the monitor.

Further more, in the prior art shown in FIG. 42, though the problem that the images are incoincident with each other at the upper side and the lower side is solved, VRAMs twice the prior art shown in FIG. 38 are needed, and therefore, there was a problem that the number of parts increases and a cost becomes high.

SUMMARY OF THE INVENTION

Therefore, a principal object of the present invention is to provide a novel video signal outputting method.

Another object of the present invention is to provide a video signal outputting apparatus capable of displaying fine images on a monitor with decreasing the number of VRAMs as much as possible.

According to the present invention, a video signal outputting apparatus comprises: N+1 of memory means each of which stores at least one of N kinds of video signals; a selecting means for selecting a video signal from the N kinds of video signals in a predetermined order; a writing means for writing a selected video signal into a memory means that writing is first completed in two memory means into which the same kind of video signals are written; a reading means for reading-out the N kinds of video signals from N of memory means that no writing is being executed, and an outputting means for outputting the N kinds of video signals as read to N of display means, respectively.

According to a second invention, an video signal outputting method comprises steps of: (a) providing N+1 of memory means each of which stores at least one of N kinds of video signals; (b) selecting a video signal from the N kinds of video signals in a predetermined order; (c) writing a selected video signal into a memory means that writing is first completed in two memory means into which the same kind of video signals are written; (d) reading-out the N kinds of video signals from N of memory means that no writing is being executed; and (e) outputting the N kinds of video signals to N of display means.

Video signals Y1-1 and Y3-3 sequentially outputted from a multiplexer which is one example of the selecting means one by one kind are written into areas C1 and C3 in areas C1, C3 and C5 of the VRAMs being three memory means, for example, by a microcomputer which is one example of the writing means. Then, the video signals Y1-1 and Y3-1 are read from the areas C1 and C3 to be displayed on predetermined areas of a monitor being two of display means. Next, video signals Y1-2 and Y3-2 are outputted from the multiplexer sequentially, and written into the areas C5 and C1 of the VRAMs, respectively. In addition, a reason why the video signal Y3-2 is written into the area C1 is that the writing into the area C1 is first completed in the areas C1 and C5 into which the same kind of video signals Y1-1 and Y1-2 are written. Then, the video signals Y1-2 and Y3-1 are outputted at a timing that the writing of the video signal Y1-2 is finished, and succeedingly, the video signals Y1-2 and Y3-2 are outputted at a timing that the writing of the video signal Y3-2 is finished.

In a preferred embodiment, two areas into which the same kind of video signals are written are detected in the areas C1, C3 and C5, and a video signal presently selected by the multiplexer is written into an area that a flag is reset of the two areas. Then, a flag of the area into which the present video signal has been written is set, and a flag of other area into which the video signal has not been written at this time is reset. Succeedingly, the video signals are read-out from areas that the flags are set in the area C1, C3 and C5.

According to the present invention, since a video signal is read-out from the memory means at a timing that the writing of the video signal is finished, images displayed on the display means do not become incoincident with each other at an upper side and an lower side. Furthermore, since only one additional memory means is required, it is possible to decrease the limit a number of the memory means.

According to a third invention, a video signal outputting apparatus comprises: a video memory having N areas; a first selecting means for selecting M ($2 \leq M \leq N$) kinds of first video signals from N kinds of the first video signals with predetermined combination; M of signal generating means which generate M kinds of second video signals for outputting from predetermined areas of the video memory on the basis of the M kinds of the first video signals; a first writing means for writing the M kinds of second video signals into the predetermined areas within a first period shorter than 1H period, respectively; a first reading means for reading-out N kinds of the second video signals from the video memory; and an outputting means for outputting the N kinds of the second video signals as read to N of display means, respectively.

In an aspect of the third invention, two kinds of the first video signals are selected in sixteen (16) kinds of the first video signals with the predetermined combination, for example. The two kinds of the first video signals are applied to, for example, a first vertical filter block and a second vertical filter block which perform as the signal generating means, respectively, where two kinds of the second video signals are generated. The two kinds of the second video signals are written into the predetermined areas of the image memory within the first period by a microcomputer which is one example of the first writing means. The sixteen (16) kinds of the video signals thus written into the video memory are read-out by the microcomputer which is also one example of the first reading means to be displayed on the predetermined areas of a monitor, for example, as N of display means.

In a preferred embodiment of the third invention, the first video signals applied to the signal generating means is thinned-out in horizontal pixel data by a D—D converter which is one example of a data thinning means, and the video signal generating means generates a fourth video signal that horizontal lines are thinned-out and a frequency of the horizontal pixel data is converted on the basis of a third video signal outputted from the D—D converter, and the fourth video signal is outputted as the second video signal.

In a more preferred embodiment, each of the sixteen (16) kinds of the first video signals is a video signal of either a first field or a second field. In a video signal generating means, an adder which is one example of a weighting means adds the third video signals of a present line and two lines before and divides by 2. The multiplexer as the selecting means selects either the third video signal or a weighted signal in accordance with the third video signal inputted into the video signal generating means is of the first field or the second field. Then, the microcomputer, for example, as a second writing means writes an output of the selecting means into a line memory, and the microcomputer, for example, as a second reading means reads the output of the selecting means being written into the line memory within a second period shorter than a ½H period, and regards a read-out signal as the fourth video signal.

According to the present invention, since M of images displayed on the N of display means are renewed in accordance with the M kinds of the first video signals selected by the selecting means, it is possible to freely select images for being renewed within one field period and increase images for being renewed within one field in accordance with the number of the video signals selected by the selecting means.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing a portion of FIG. 1 embodiment;

FIG. 3 is an illustrative view showing another portion of FIG. 1 embodiment;

FIG. 4 is an illustrative view showing a further portion of FIG. 1 embodiment;

FIG. 12(A) is an illustrative view showing video signals written into VRAMs, and FIG. 12(B) is an illustrative view showing images displayed on a monitor;

FIG. 13(A) is an illustrative view showing video signals written into the VRAMs, and FIG. 13(B) is an illustrative view showing images displayed on the monitor;

FIG. 14(A) is an illustrative view showing video signals written into the VRAMs, and FIG. 14(B) is an illustrative view showing images displayed on the monitor;

FIG. 20 is an illustrative view showing a content of a RAM;

FIGS. 21 and 22 is a flowcharts showing a portion of an operation of FIG. 15 embodiment;

FIG. 23 is a flowchart showing a portion of the operation of FIG. 15 embodiment;

FIG. 26 is a flowchart showing a portion of the operation of FIG. 15 embodiment;

FIG. 27 is a flowchart showing a portion of the operation of FIG. 15 embodiment;

FIG. 29 is a flowchart showing a portion of the operation of FIG. 15 embodiment;

FIG. 31 is a flowchart showing a portion of the operation of FIG. 15 embodiment;

Figures 43A, 43B, 43C:
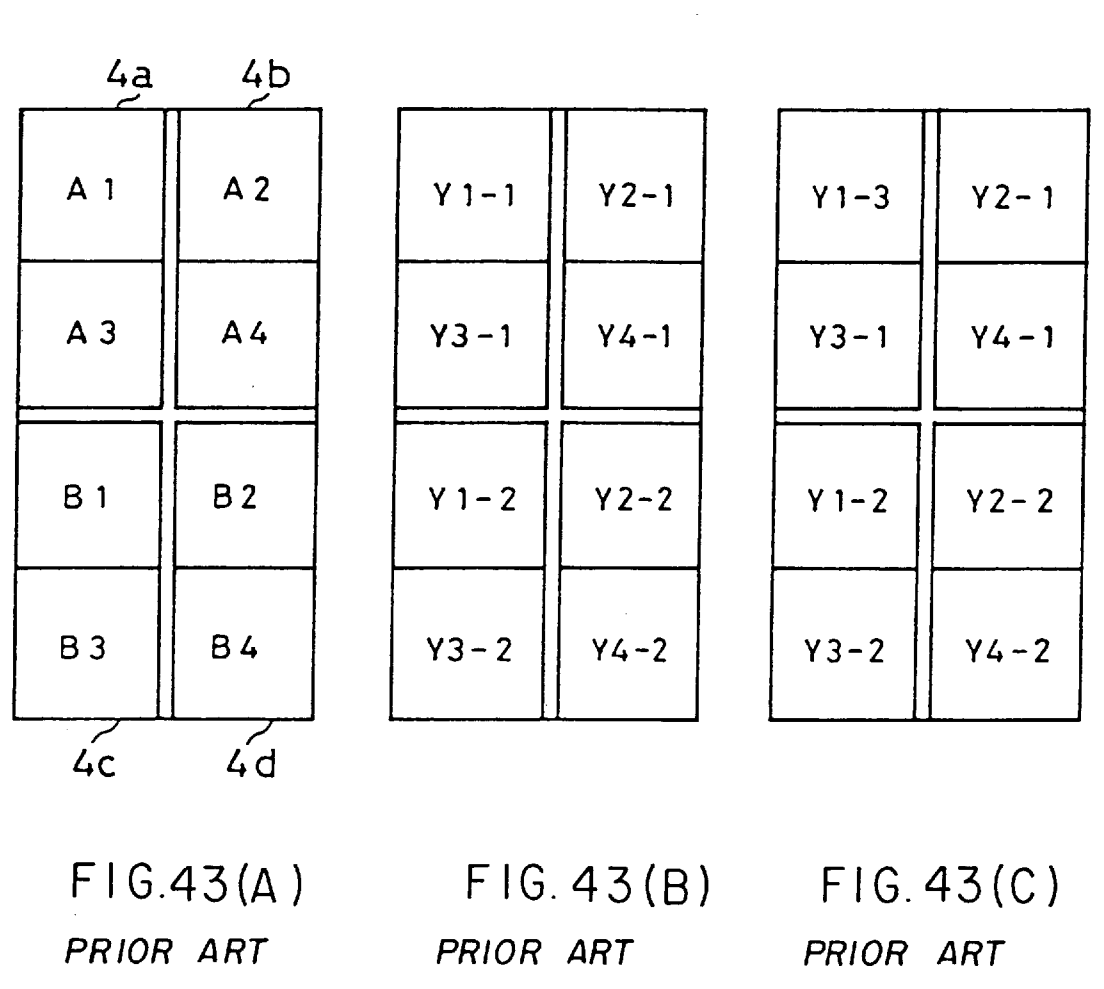

FIG. 43(A) is an illustrative view showing VRAMs, and FIG. 43(B) and (C) are illustrative views showing video signals written into the VRAMs;

DETAILED DESCRIPTION OF THE PREFERRED EMBODIMENTS

Figure 1:
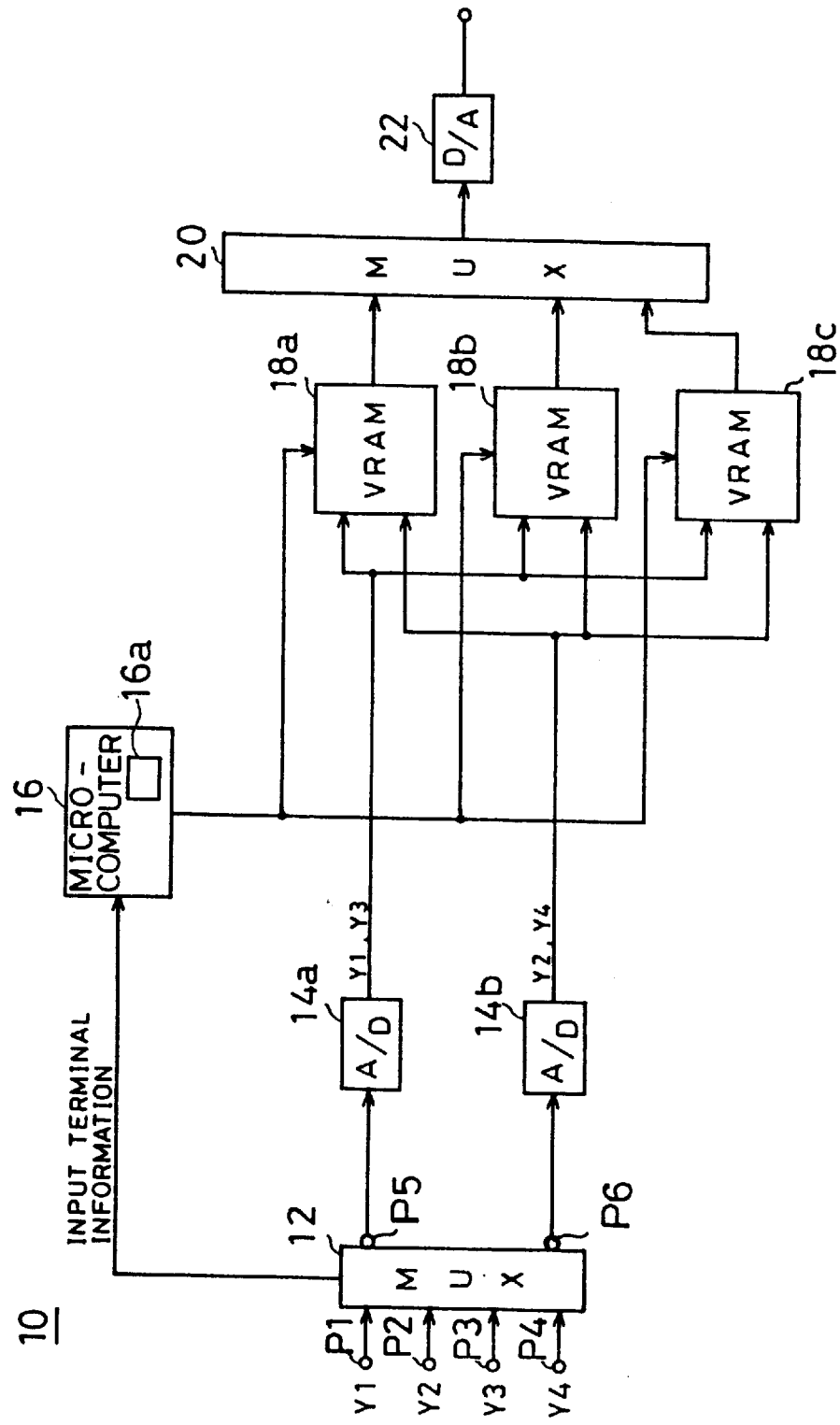
FIG. 1 is a block diagram showing an embodiment according to the present invention.

With referring to FIG. 1, a video signal outputting apparatus 10 of this embodiment includes input terminals P1 to P4 from which video signals equal to quarters of one field, that is, video signals Y1 to Y4 that horizontal pixels and horizontal lines are thinned-out into halves are applied to a multiplexer 12. The video signals Y1 and Y3 are applied to an A/D converter 14a from an output terminal P5 of the multiplexer 12 at every two fields to be converted into digital signals. Furthermore, the video signals Y2 and Y4 are applied to an A/D converter 14b from an output terminal P6 of the multiplexer 12 at every two fields to be converted into digital signals. Furthermore, input terminal information indcating that the video signals inputted to which ones of the input terminals P1 to P4 are applied to the A/D converters 14a and 14b from the output terminals P5 and P6 is applied to a microcomputer 16 from the multiplexer 12. The input terminal information is "00" for the video signal Y1, the input terminal information is "01" for the video signal Y2, the input terminal information is "10" for the video signal Y3, and the input terminal information is "11" for the video signal Y4.

The video signals Y1 and Y3 outputted from the A/D converter 14a and the video signals Y2 and Y4 outputted from the A/D converter 14b are applied to VRAMs 18a to 18c, and written into any of areas C1 to C6 shown in FIG. 2 in accordance with write enable signals and address signals from the microcomputer 16. Then, the video signals Y1 to Y4 are read-out from the areas C1 to C6 according to read enable signals and the address signals from the microcomputer 16 to be applied to a monitor 24 via a multiplexer 20 and a D/A converter 22. Therefore, images according to the video signals Y1 to Y4 are displayed on a MON1 block to a MON4 block of the monitor 24 shown in FIG. 3. In addition, each of the areas C1 to C6 of the VRAMs 18a to 18c has addresses of (column, row)=(0, 0)–(270, 120). Furthermore, the input terminal information and flag information concerned with the video signals Y1 to Y4 stored into the areas C1 to C6 as shown in FIG. 4 are written into a RAM 16a included in the microcomputer 16.

Figure 5:
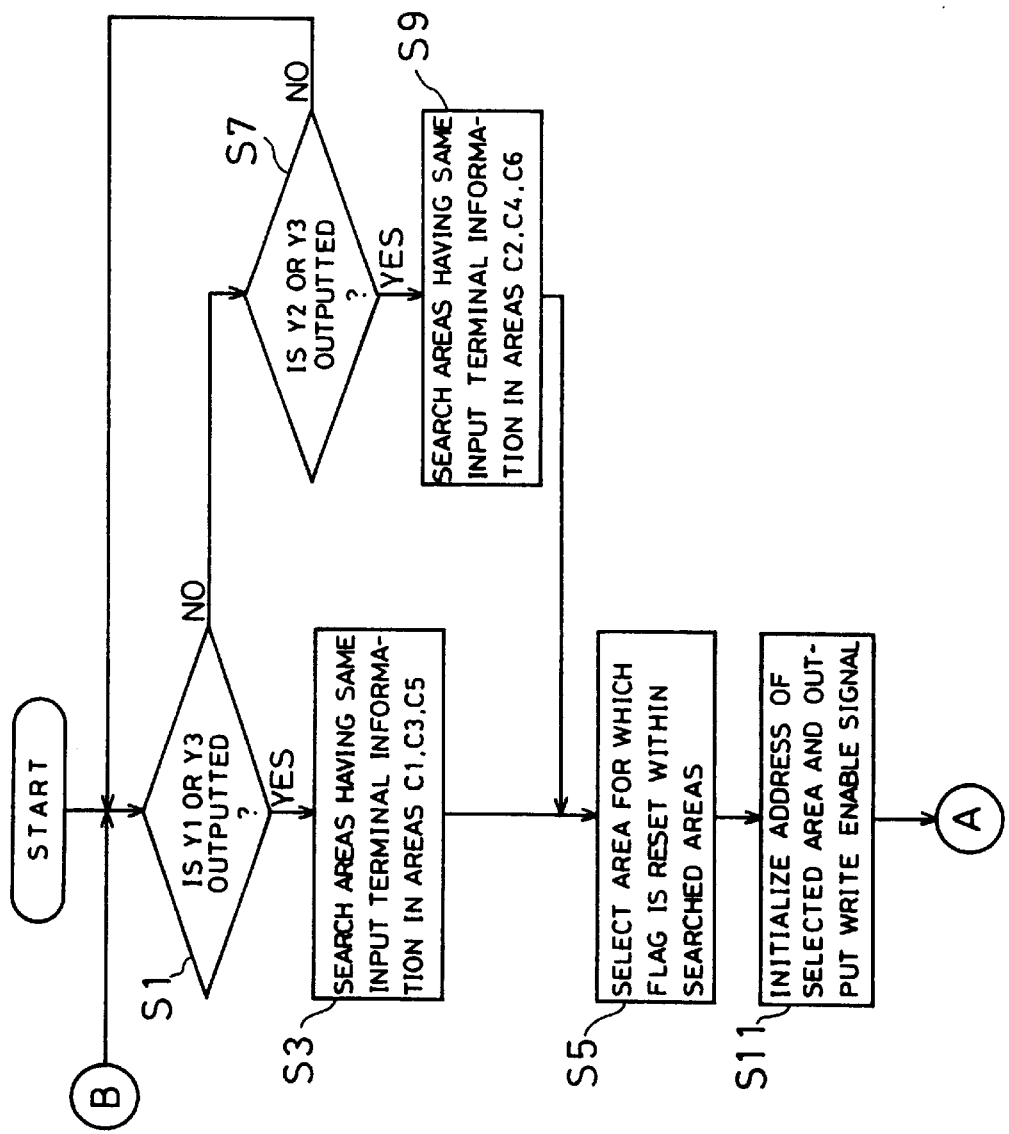
FIG. 5 is a flowchart showing a portion of an operation of FIG. 1 embodiment.
Figure 6:
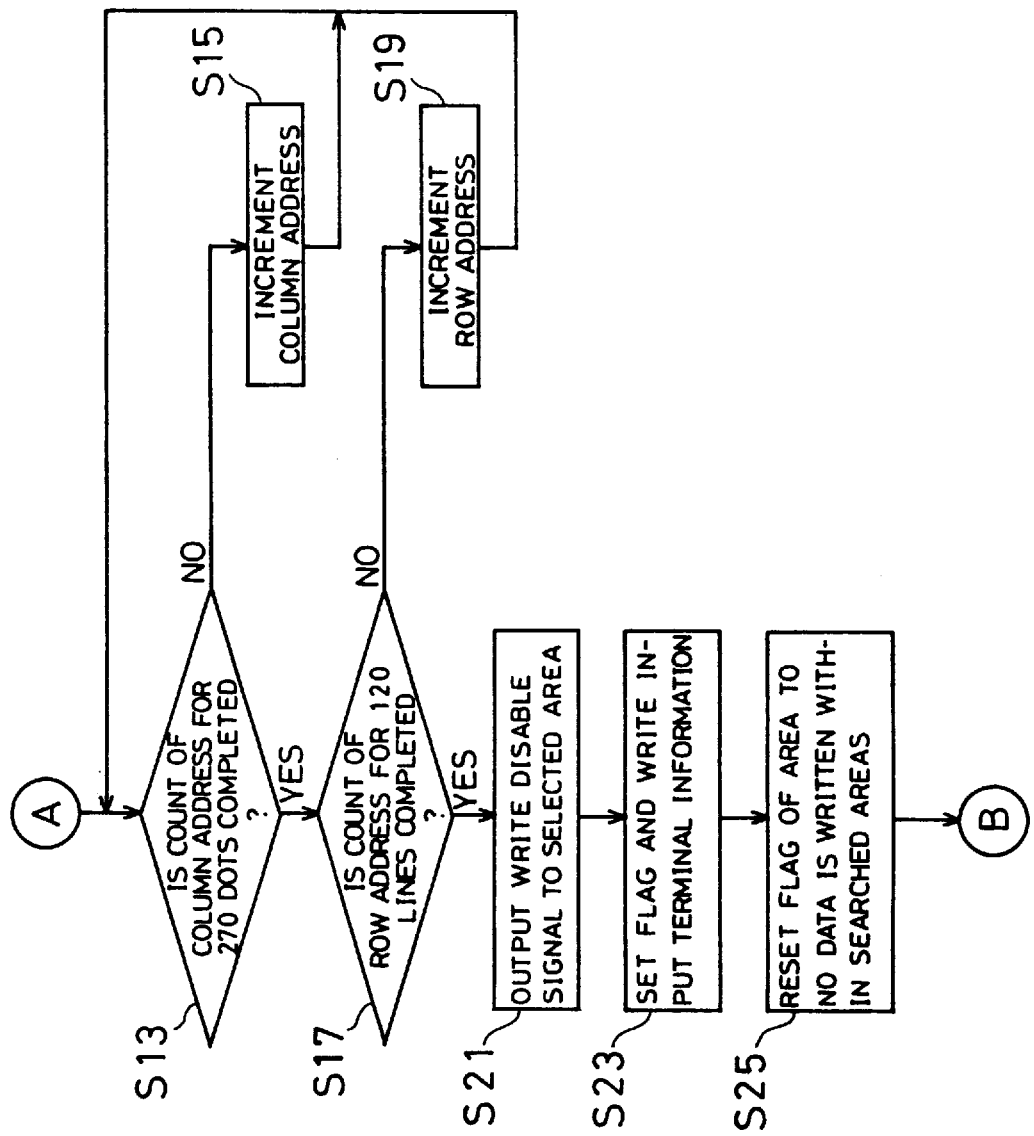
FIG. 6 is a flowchart showing a portion of the operation of FIG. 1 embodiment.
Figure 7:
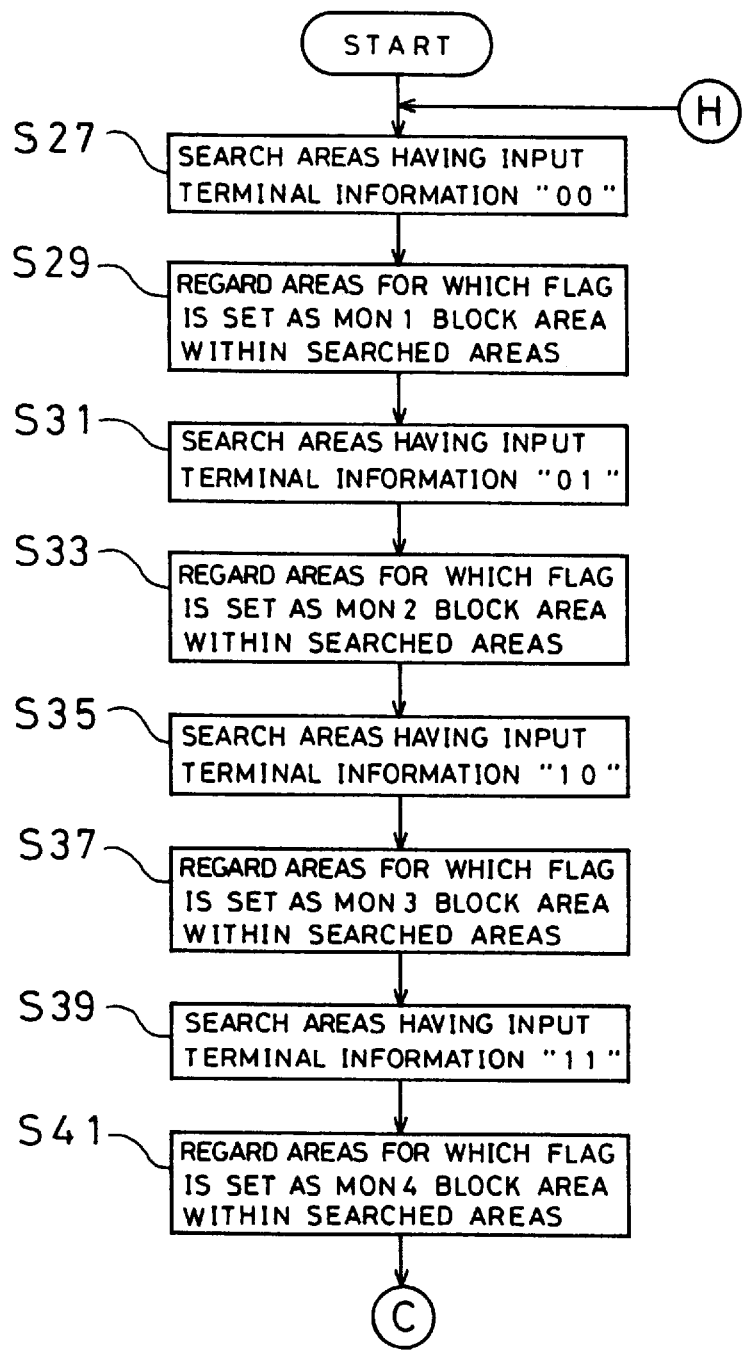
FIG. 7 is a flowchart showing a portion of the operation of FIG. 1 embodiment.
Figure 8:
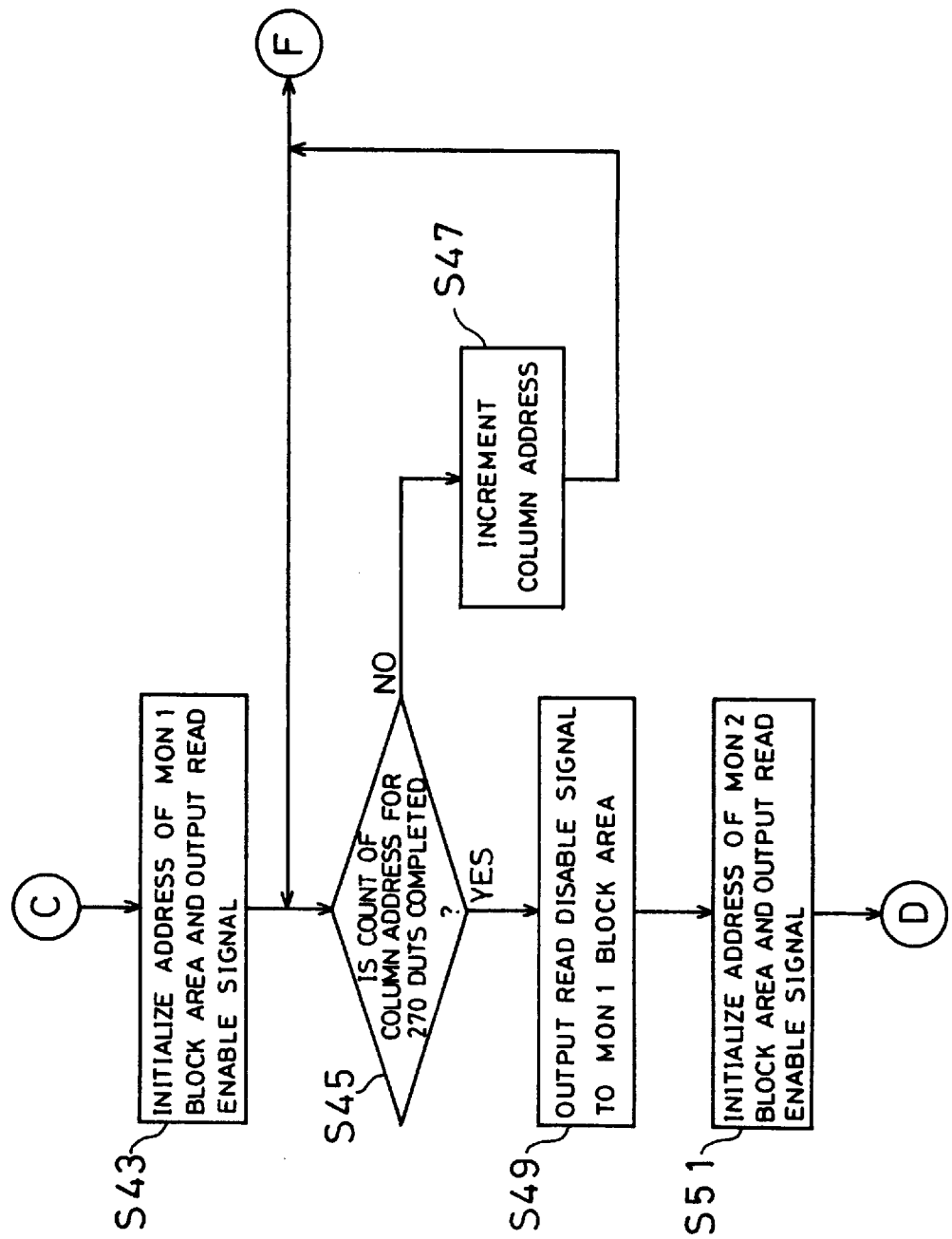
FIG. 8 is a flowchart showing a portion of the operation of FIG. 1 embodiment.
Figure 9:
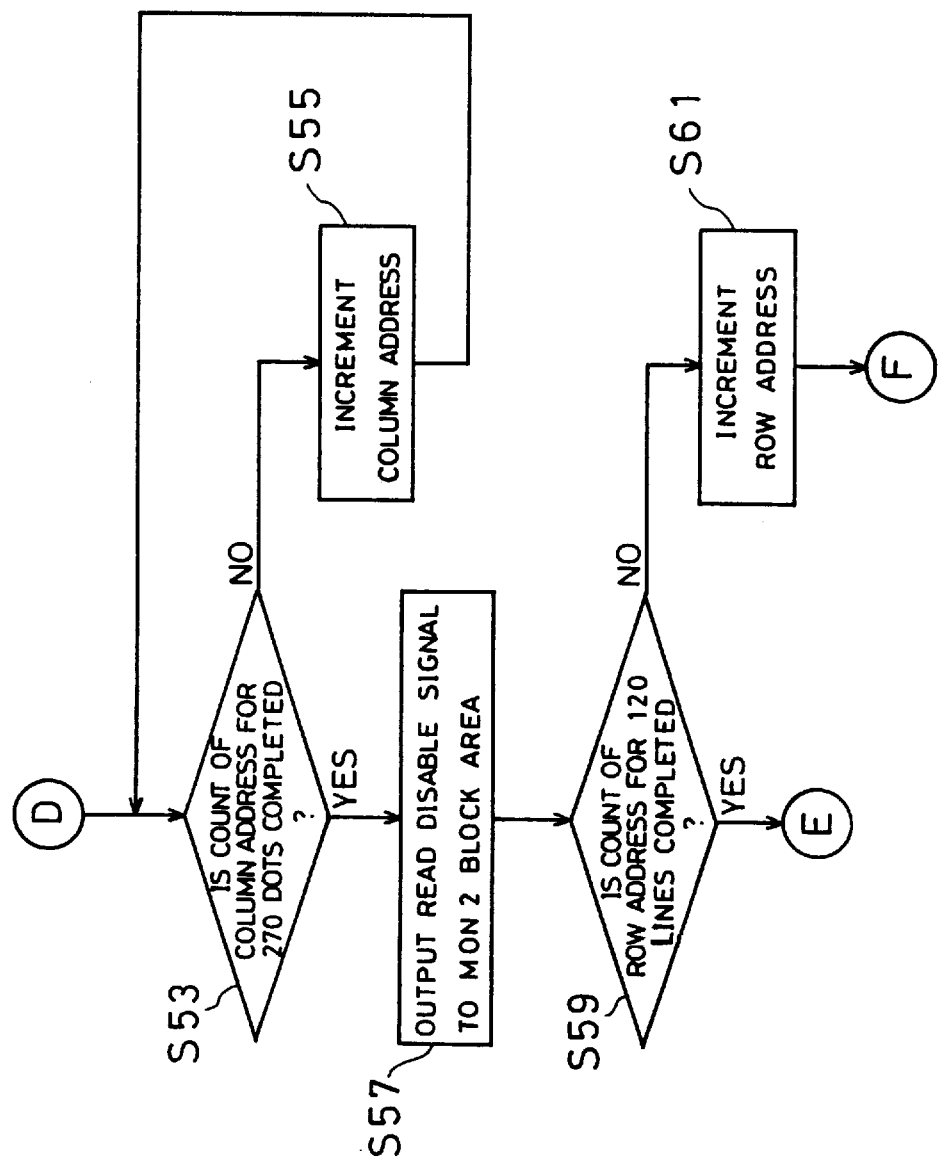
FIG. 9 is a flowchart showing a portion of the operation of FIG. 1 embodiment.
Figure 10:
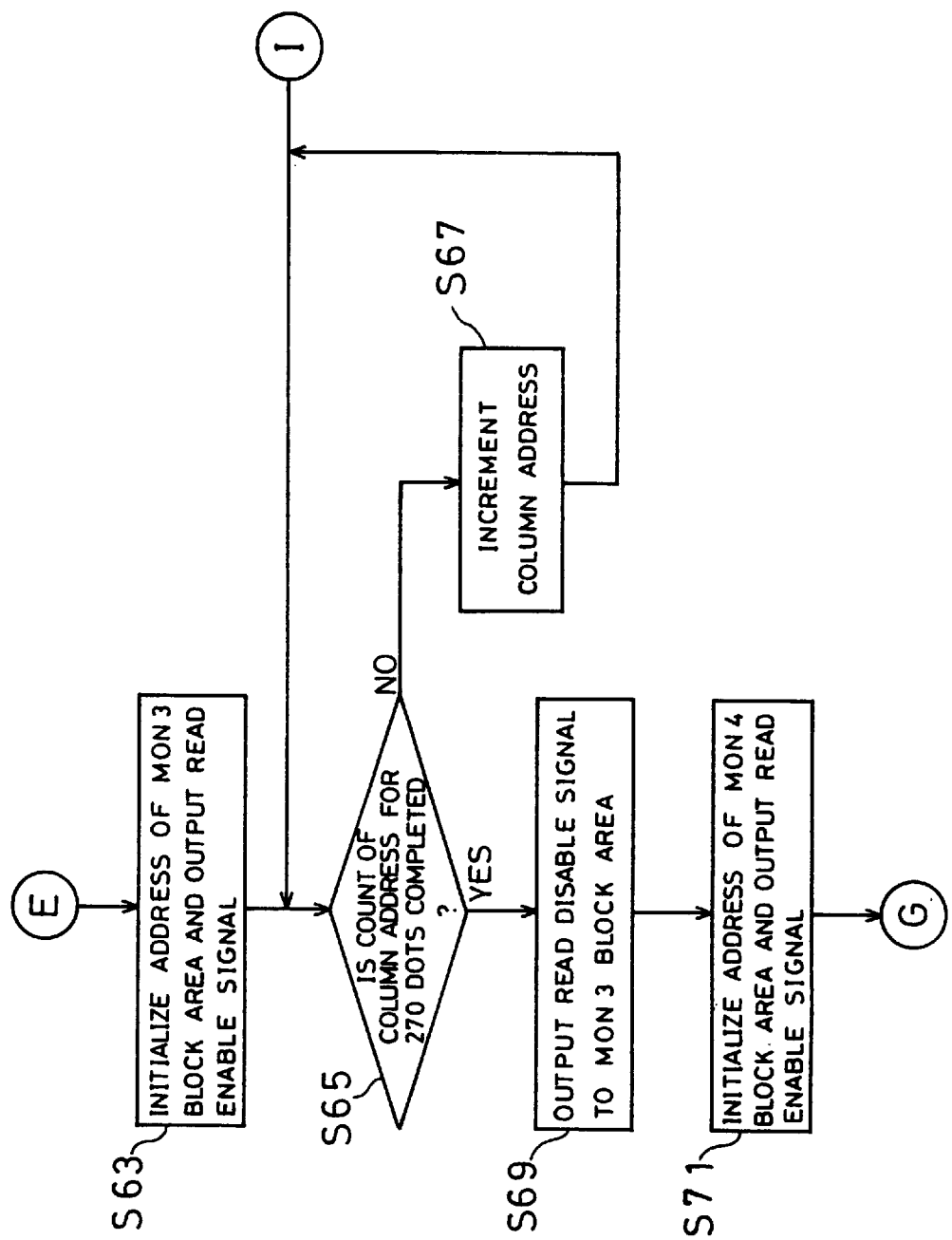
FIG. 10 is a flowchart showing a portion of the operation of FIG. 1 embodiment.
Figure 11:
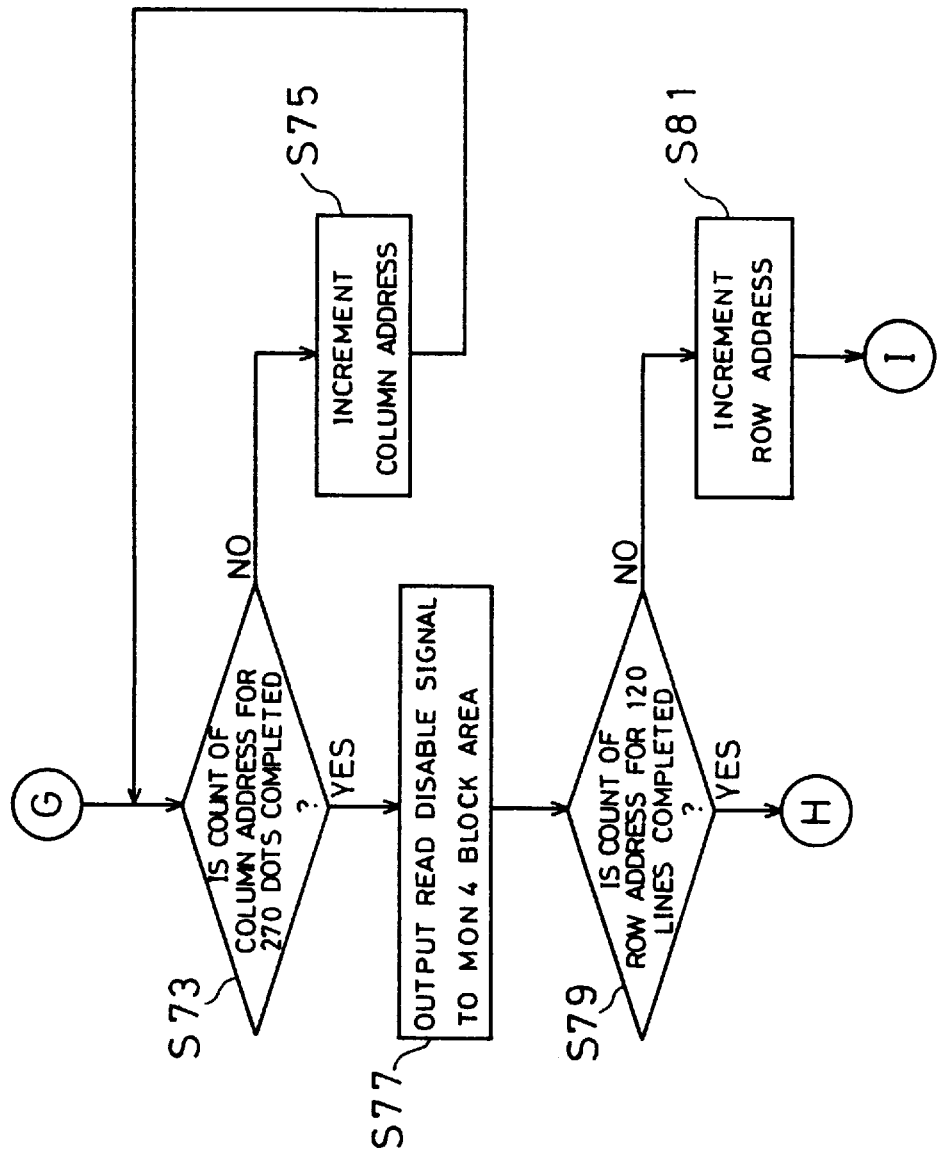
FIG. 11 is a flowchart showing a portion of the operation of FIG. 1 embodiment.

Next, a processing operation of the microcomputer 16 in writing video signals Y1 to Y4 into the areas C1 to C6 will be described with referring to FIG. 5 and FIG. 6. At first, it is determined whether or not the video signal Y1 or Y3 is outputted on the basis of the input terminal information applied from the multiplexer 12 in a step S1. Then, if "YES", areas having the same input terminal information are searched in the areas C1, C3 and C5 with referring to the RAM 16a, and the process proceeds to a step S5. On the other hand, if "NO" in the step S1, it is determined whether or not the video signal Y2 or Y4 is outputted from the multiplexer 12 on the basis of the input terminal information from the multiplexer 12 in a step S7. Then, if "NO", the process returns back to the step S1, and if "YES", areas having the same input terminal information are searched in the areas C2, C4 and C6 in a step S9, and thereafter, the process proceeds to the step S5. As a result of the search in the step S3 or S9, areas having the same input terminal information are two areas in three areas, and an area that a flag is reset is selected in the two areas with referring to the RAM 16a in the step S5. Then, the column address and the row address of the selected area are initialized and the write enable signal is outputted.

Succeedingly, it is determined whether or not the column addresses for 270 dots are counted, and if "NO", the column address is incremented in a step S15 and the process returns back to the step S13; however, if "YES", it is determined whether or not the row addresses for 120 lines are counted in a step S17. If "NO", in this step, the row address is incremented in a step S19 and the process returns back to the step S13, and if "YES", a write disable signal is outputted to the selected area in a step S21, and in a step S23, the flag of the selected areas is set and the input terminal information of the stored video signal is written into the RAM 16a. Then, flags for areas that no writing is executed in the areas searched in the step S3 or S9 are reset in a step S25, and the process returns back to the step S1.

Then, with referring to FIG. 7 to FIG. 11, a processing operation of the microcomputer 16 in reading-out the video signals Y1 to Y4 from the areas C1 to C6 will be described. At first, areas having the input terminal information "00" are searched with referring to the RAM 16a in a step S27, and thereafter, an area that a flag is set in the searched areas is regarded as a MON1 block area. Next, areas having the input terminal information "01" are searched in a step S31, and an area that the flag is set in the searched area is regarded as a MON2 block area in a step S33. Then, areas having the input terminal information "10" are searched in a step S35, and an area that the flag is set in the searched areas is regarded as a MON3 block area in a step S37. Thereafter, areas having the input terminal information "11" are searched in a step S39, and an area that the flag is set in the searched area is regarded as a MON4 block area in a step S41.

Succeedingly, the column address and the row address of the MON1 block area are initialized and the read enable signal is outputted in a step S43. Then, it is determined whether or not the column addresses for 270 dots are counted in a step S45, and if "NO", the column address is incremented in a step S47 and the process returns back to the step S45, and if "YES", the read disable signal is outputted to the MON1 block area in a step S49. Then, the column address and the row address of the MON2 block area are initialized and the read enable signal is outputted in a step S51. Then, it is determined whether or not the column addresses for 270 dots are counted in a step S53, and if "NO", the column address is incremented in a step S55 and the process returns back to the step S53, and if "YES", the read disable signal is outputted to the MON2 block area in a step S57. Next, it is determined whether or not the row addresses for 120 lines are counted in a step S59, and if the row address is incremented in a step S61 and the process returns back to the step S45, and if "YES", the process proceeds to a step S63.

The column address and the row address of the MON3 block area are initialized and the read enable signal is outputted in the step S63. Then, it is determined whether or not the column addresses for 270 dots are counted in a step S65, and if "NO", the column address is incremented in a step S67 and the process returns back to the step S65, and if "YES", the read disable signal is outputted to the MON3 block area in a step S69. Then, the column address and the row address of the MON4 block area are initialized and the read enable signal is outputted in a step S71. It is determined whether or not the column addresses for 270 dots are counted in a step S73, and if "NO", the column address is incremented in a step S75 and the process returns back to the step S73, and if "YES", the read disable signal is outputted to the MON4 block area in a step S77. Then, it is determined whether or not the row addresses for 120 lines are counted, and if "NO", the row address is incremented in a step S81 and the process returns back to the step S65, and if "YES", the process returns back to the step S27.

Through the processing operations of the microcomputer 16 in the above described manner, the video signals Y1-1 to Y4-1 inputted at the beginning are written into the areas C1 to C4 of the VRAMs 18a and 18b as shown in FIG. 12(A), so that the video signals Y1-1 to Y4-4 are outputted on the MON1 block to MON4 block of the monitor 24. Then, video signals Y1-2 and Y2-2 outputted from the A/D converter 14a and 14b are written into the areas C5 and C6 of the VRAM 18c as shown in FIG. 13(A). Though the video signals shown in FIG. 12(B) are outputted on the monitor 24 during a time that the video signals Y1-2 and Y2-2 are being written, when the writing of the video signals Y1-2 and Y2-2 is finished, the microcomputer 16 is read out the video signals Y1-2, Y2-2, Y3-1 and Y4-1 in an order of the areas C5, C6, C3 and C4. Thus, the video signals Y1-2, Y2-2, Y3-1 and Y4-1 are outputted on the monitor 24 as shown in FIG. 13(B). That is, images in the MON1 block and the MON2 block are renewed.

Succeedingly, when video signals Y3-2 and Y4-2 are outputted from the A/D converter 14a and 14b, the microcomputer 16 searches areas having the same input terminal information and selects an area that the flag is reset. Therefore, the video signals Y3-2 and Y4-2 are written into the areas C1 and C2 as shown in FIG. 14(A). Then, though the video signals shown in FIG. 13(B) are outputted from the monitor 24 for a time that the writing is being executed, when the writing is finished, the video signals shown in FIG. 14(B) are outputted on the monitor 24. That is, the imge signals in the MON3 and MON4 are renewed.

According to the above described embodiment, at a timing that the writing of video signals is finished, the video signals are read-out from the VRAMs to be outputted on the monitor, the images on the monitor do not become incoincident with each other at an upper side and a lower side. Furthermore, since only one additional VRAM is required, it is possible to limit the number of memories as much as possible.

In addition, though this embodiment is described with using the monitor divided into four blocks, it is possible to apply the present invention for a case where the video signals are outputted on four monitors, respectively.

However, in the above described embodiment, it is limited to select areas in which the video signals are to be renewed. A video signal outputting apparatus 10 described in the following is for solving such a problem.

Figure 15:
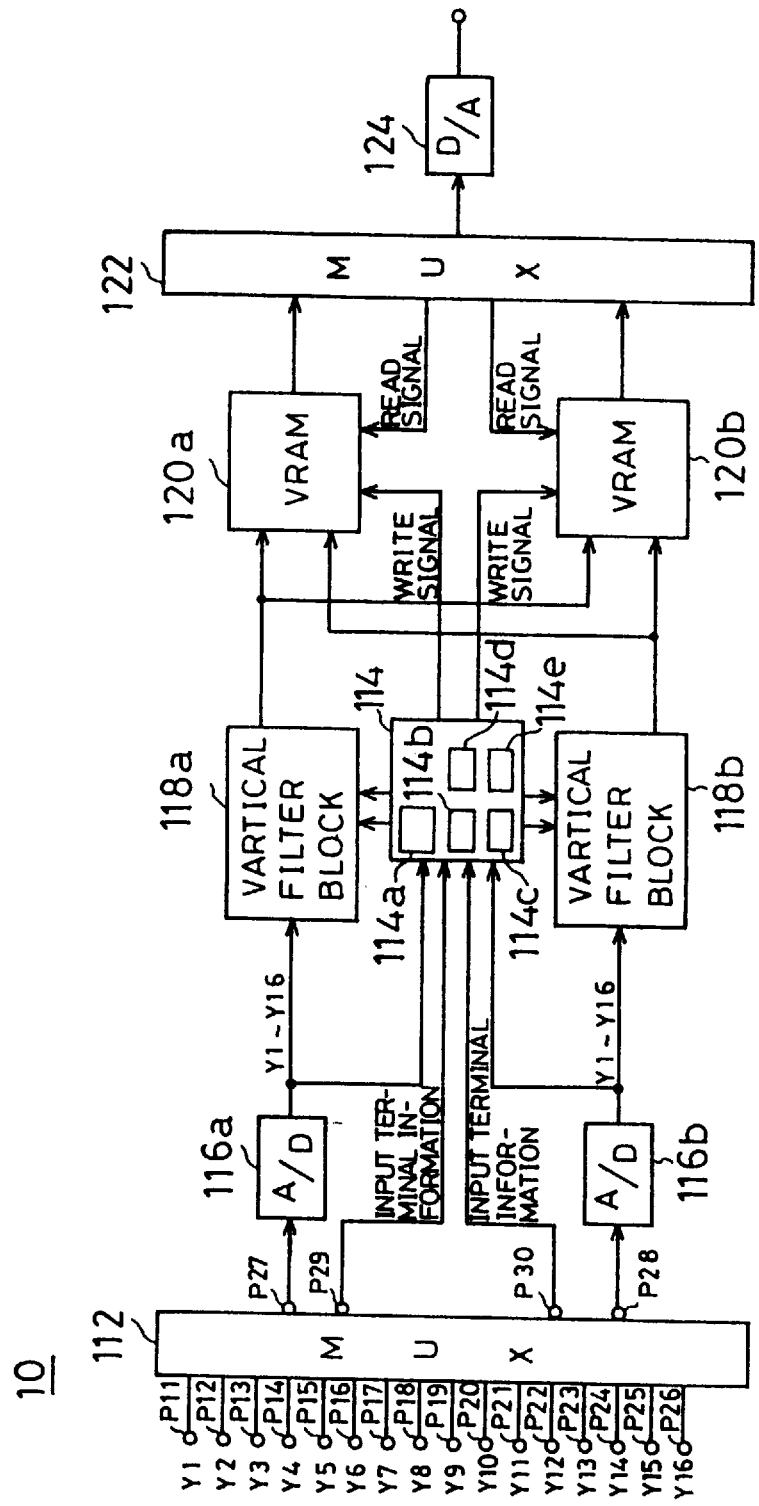
FIG. 15 is a block diagram showing an embodiment according to other invention.

With referring to FIG. 15, a video signal outputting apparatus 10 of this embodiment shown includes a multiplexer 112 which is provided with input terminals P11 to P26 to receive video signals Y1 to Y16. The multiplexer 112 selects two kinds of the video signals in a predetermined order and with predetermined combination at every one field and outputs from output terminals P27 and P28 under a control of a system control microcomputer (not shown). The multiplexer 112 selects the video signals at every sixty (60) fields, for example, as follows: The video signals Y1 and Y2 are outputted from the output terminals P27 and P28 for fifty three (53) fileds period from the beginning, and two of the video signals Y3 to Y16 are selected in an order that coefficients are smaller than the others at every one field out-of remaining seven (7) fields period and are outputted. The multiplexer 112 also applies input terminal information of the video signal outputted from the output terminal P27 to a microcomputer 114 from an output terminal P29, and applies input terminal information of the video signal outputted from the output terminal P28 to the microcomputer 114 from an output terminal P30. The input terminal information is data of 4 bits indicating that the video signal is applied from what input terminal and outputted from the multiplexer 112. The input terminal information is incremented from "0000" to "1111" in accordance with the input terminal P11 to P26 or the video signals Y1 to Y16. In addition, as is different from the prior art, the multiplexer 112 can output the video signals Y1 to Y16 from both of the output terminals P27 and P28.

Figure 16:
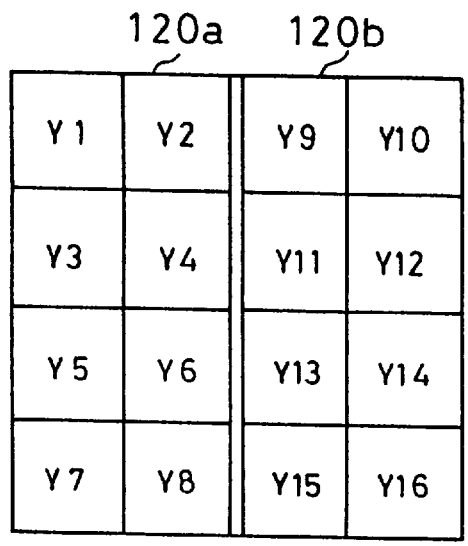
FIG. 16 is an illustrative view showing VRAMs.

The video signals outputted from the output terminal P27 are applied to a vertical filter block 118a and the microcomputer 114 after being converted into digital signals by an A/D converter 116a, and the video signals Y1 to Y16 outputted from the output terminal P28 are applied to a vertical filter block 118b and the microcomputer 114 after being converted into the digital signals by an A/D converter 116b. The vertical filter blocks 118a and 118b are controlled by the microcomputer 114 so as to extract portions of the inputted video signals. Extracted portions of the video signals are applied to VRAMs 120a and 120b to be written into predetermined areas according to a write signal from the microcomputer 114. In addition, the write signal includes a write enable signal, a write disable signal and an address signal. Furthermore, the VRAMs 120a and 120b include Y1 area to Y8 area into which the video signals Y1 to Y8 are written and Y9 area to Y16 area into which the video signals Y9 to Y16 are written, respectively, as shown in FIG. 16, and thus, video signals for one frame of a monitor 126 are written thereinto. Each area of the VRAMs 120a and 120b has addresses of (column, row)=(0, 0)–(180, 120), and only an address of a specific area can be initialized by a control signal from the microcomputer 114.

Figure 17:
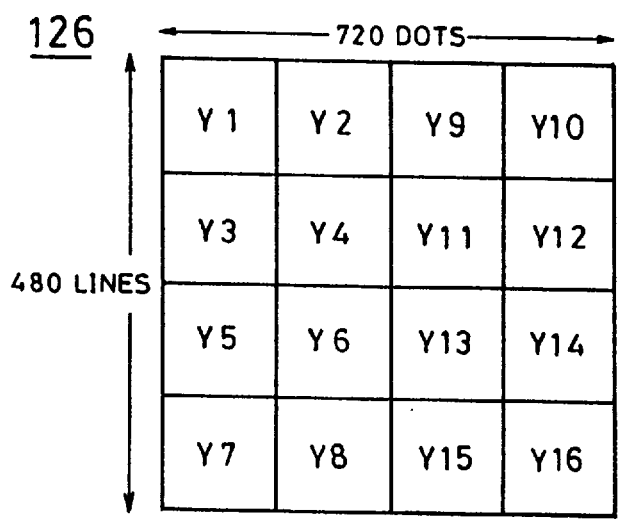
FIG. 17 is an illustrative view showing a monitor.

The video signals stored in the VRAMs 120a and 120b are read-out by a read signal from the multiplexer 122 in an interlaced manner, and read video signals are applied to the monitor 126 constituted by 720 dots×480 lines as shown in FIG. 17 via a D/A converter 124. Therefore, images divided into sixteen (16) blocks and corresponding to the video signals Y1 to Y16 are displayed on the monitor 126. In addition, the read signal includes a read enable signal, a read disable signals and an address signal.

Figure 18:
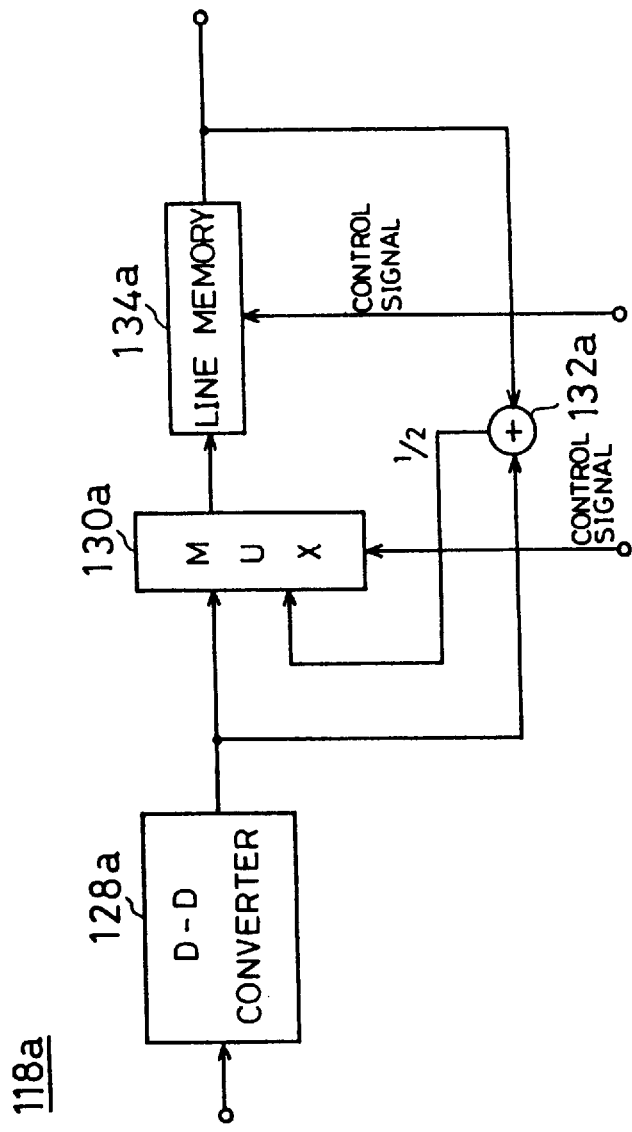
FIG. 18 is a block diagram showing a vertical filter block.
Figure 19:
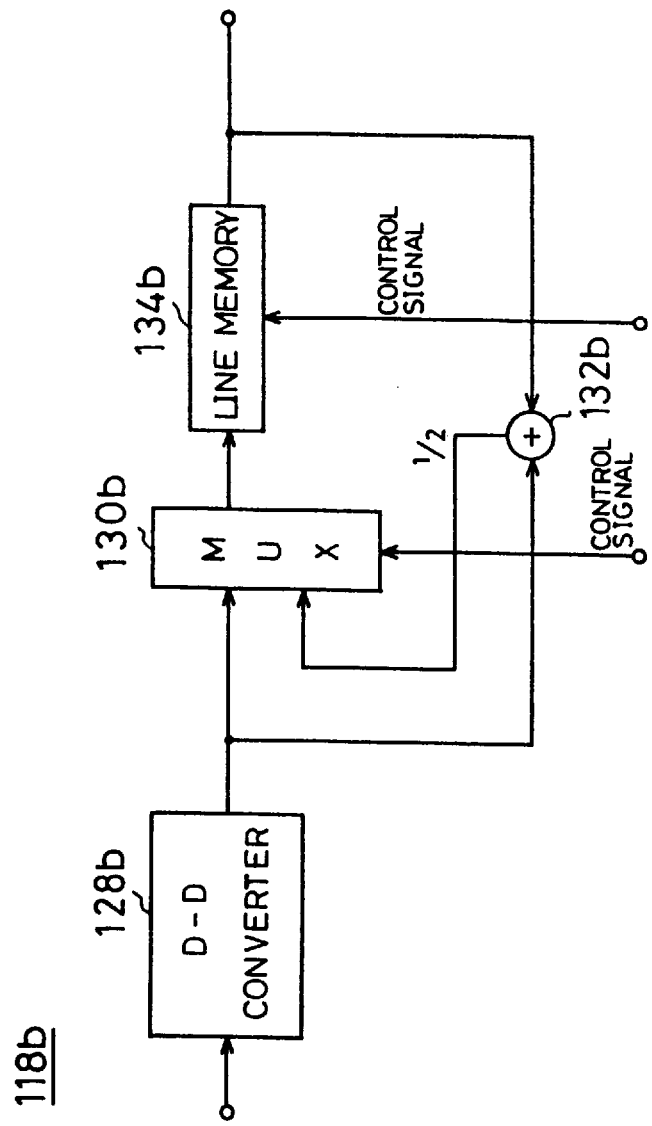
FIG. 19 is a block diagram showing another vertical filter block.
Figure 21:
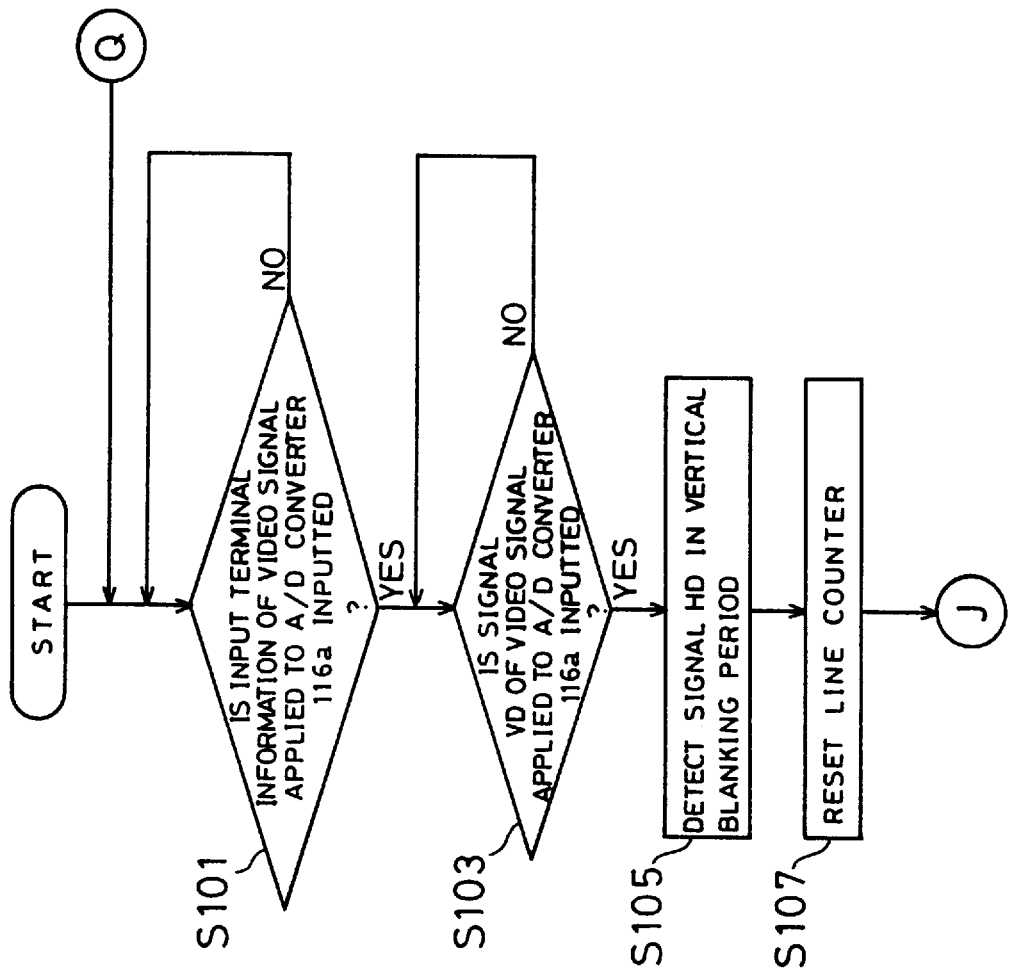
Figure 24:
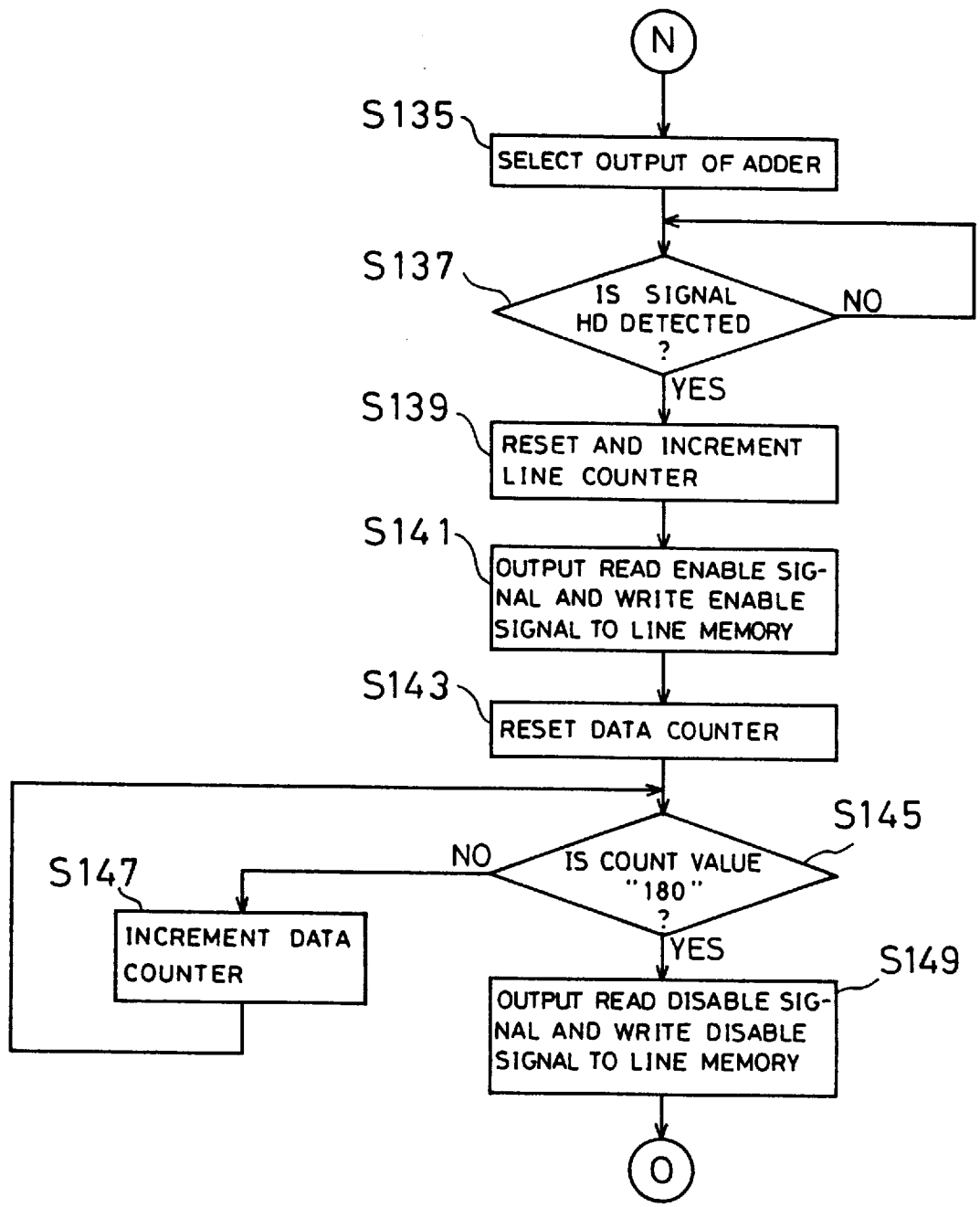
FIG. 24 is a flowchart showing a portion of the operation of FIG. 15 embodiment.

The vertical filter block 118a is constituted as shown in FIG. 18. The video signals outputted from the A/D converter 116a are applied to a D—D converter 128a that a horizontal sampling number (frequency) is a quarter of a sampling number (frequency) of the A/D converter 116a, whereby the inputted video signal equal of one line is thinned-out at ¼. Video signals outputted from the D—D converter 128 are applied to a multiplexer 130a and an adder 132a. The video signals are added to video signals being of one line before and outputted from the line memory 134a, and an addition result is divided by 2 by the adder 132a, and an output of the adder 132a is applied to the multiplexer 130a. The multiplexer 130a selects either an output of the D—D converter 132a or the output of the adder 132a in accordance with the control signal from the microcomputer 114. Then, video signals outputted from the multiplexer 130a are written into the line memory 134a and read-out with being delayed by 1H period by the control signal from the microcomputer 114. In addition, since the vertical filter block 118b shown in FIG. 19 is constituted in the same structure as the vertical filter block 118a, a duplicate description will be omitted here with replacing "a" added to referring numerals with "b".

A table shown in FIG. 20 is written into a RAM 114a included in the microcomputer 114. More specifically, in the RAM 114a, the input terminal information of the video signals written into the Y1 area to Y16 area of the VRAMs 120a and 120b are written in corresponding to these areas, and write flags for indicating which ones of the video signals are being written into the VRAMs 120a and 120b are provided in corresponding to the Y1 area to the Y8 area and the Y9 area to the Y16 area, and a field flag for indicating whether video signals being written into the VRAMs 120a and 120b are of an even field or an odd field is provided. The write flag is set while the video signals are being written, and the field flag is set during a time that the video signal of the odd field is being written. In addition, a term "odd field" or "even field" indicates a filed number of the video signal written into the VRAMs 120a and 120b rather than a field number of the image outputted on the monitor 126.

With referring to FIG. 21 to FIG. 32, a processing operating during a time that the microcomputer 114 controls the vertical filter block 118a and the VRAM 120a will be described. At first, if it is determined that the input terminal information of the video signal applied to the A/D converter 116a is inputted in a step S101, and if it is determined that a vertical synchronization signal of the video signal is inputted in a step S103, a horizontal synchronization signal included in a vertical blanking period of the video signal is detected in step S105. Next, a line counter 114b included in the microcomputer 114 is reset in a step S107, and it is determined whether or not the detected vertical synchronization signal and the detected horizontal synchronization signal are in phase in a step S109. If "YES", the field flag is reset in a step S111 as the video signal is of the even field, but if "NO", the filed flag is set in a step S113 as the video signal is of the odd filed. When the step S111 or S113 has been executed, the multiplexer 130a is controlled so as to select the output of the D—D converter 128a in a step S115, and in response to a horizontal synchronization signal detected in a step S117, the line counter 114b is incremented in a step S119. In addition, the horizontal synchronization signal detected in the step S117 is a signal added the video signal to be written into the line memory 134a at a front portion thereof.

Succeedingly, the write enable signal is outputted to the line memory 134a in a step S121, and next, a data counter 114c is reset in a step S123. Thereafter, it is determined whether or not a count value of the data counter 114c for pointing an address of the line memory 134a is equal to "180" in a step S125, and if "NO", the data counter 114c is incremented and the process returns back to the step S125; however, if "YES", the write disable signal is outputted to the line memory 134a in a step S129. Then, it is determined whether or not the filed flag is set in a step S131, and if "NO", it is determined whether or not the most significant bit of the input terminal information is "0" in a step S133 as the inputted video signal is of the even field. Then, if "YES", the process proceeds to FIG. 25 as the video signal applied to the A/D converter 116a is one of the video signals Y1 to Y8, and if "NO", the process proceeds to FIG. 27 as the video signal is one of the video signal Y9 to Y16.

Figure 25:
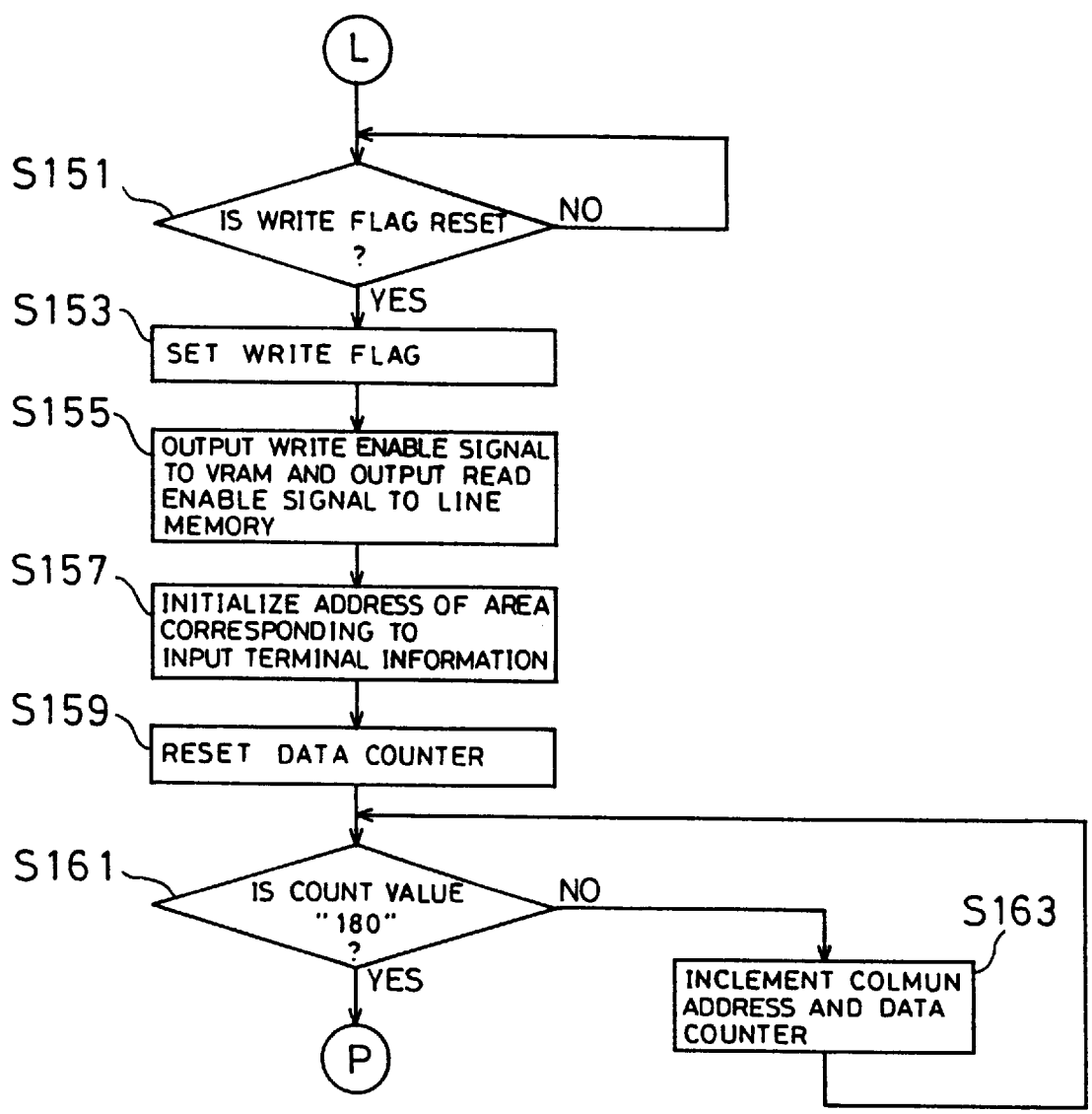
FIG. 25 is a flowchart showing a portion of the operation of FIG. 15 embodiment.
Figure 28:
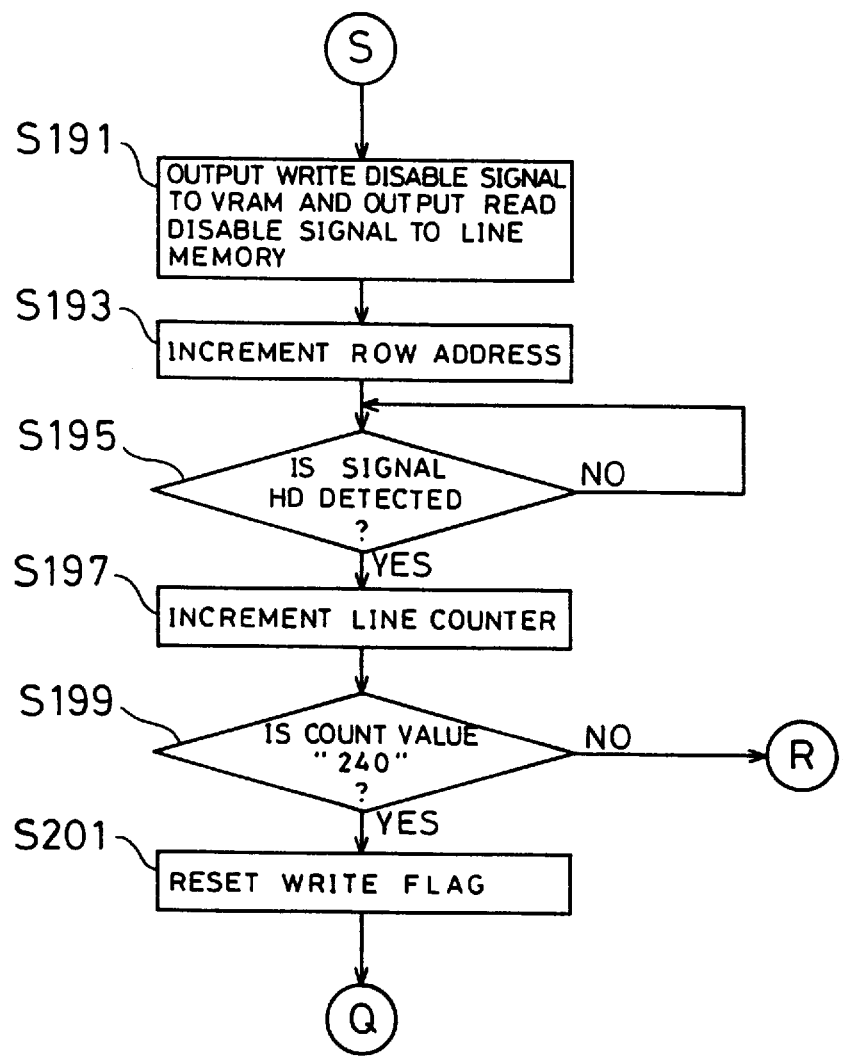
FIG. 28 is a flowchart showing a portion of the operation of FIG. 15 embodiment.
Figure 30:
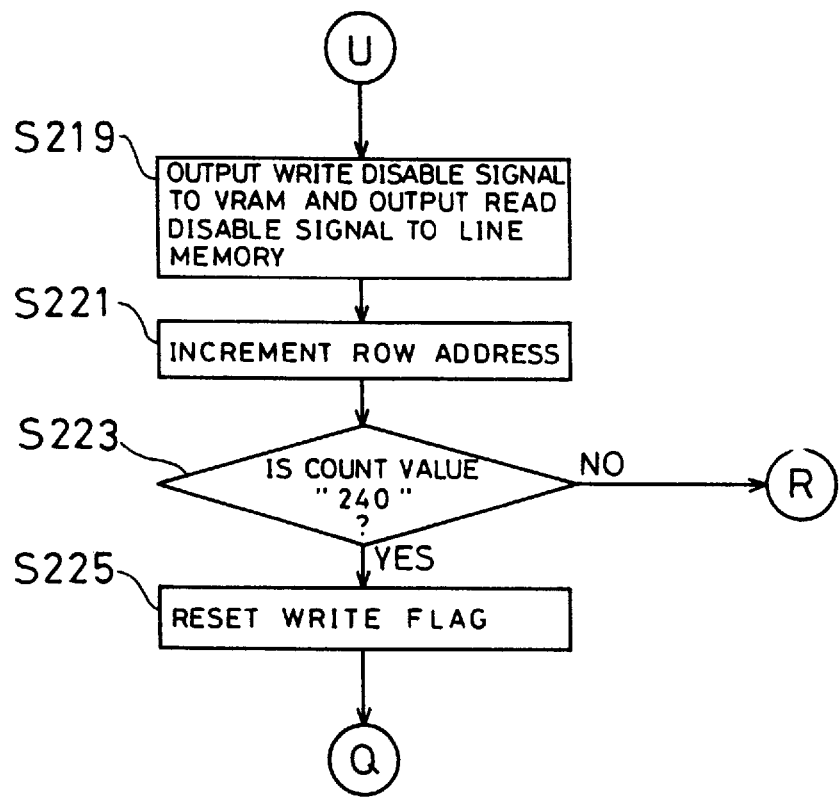
FIG. 30 is a flowchart showing a portion of the operation of FIG. 15 embodiment.

Next, it is determined whether or not the write flag for the VRAM 120a is reset in a step S151 shown in FIG. 25, and if "YES", the write flag is set in a step S153. Succeedingly, the write enable signal is outputted to the VRAM 120a and the read enable signal is outputted to the line memory 134a in a step S155. Thereafter, in a step S157, by comparing the input terminal information applied to the microcomputer 114 from the output terminal P29 of the multiplexer 112 and the input terminal information stored in the RAM 114a with each other, the area corresponding to the input terminal information is searched and the addresses of that area are initialized. Then, the data counter 114c is reset in a step S159, and it is determined whether or not the count value of the data counter 114c is equal to "180" in a step S161. Then, if "NO", the column address of the area searched in the step S157 and the data counter 114c is incremented in a step S163, and the process returns back to the step S161; however, if "YES", the write disable signal is outputted to the VRAM 120a and the read disable signal is outputted to the line memory 134a in a step S165. Therefore, the writing of a video signal read-out from the line memory 134a into the VRAM 120a is completed.

Succeedingly, the row address of the area searched in the step S157 is incremented in a step S167, and in response to a horizontal synchronization signal detected in a step S169, the line counter 114b is incremented in a step S171. Thereafter, it is determined whether or not a count value of the line counter 114b is equal to "240" in a step S173, and if "NO", the process returns back to the step S115; however, if "YES", the write flag for the VRAM 120a is reset in a step S175, and the process returns back to the step S101. Accordingly, a video signal following the horizontal synchronization signal detected in the step S169 is not written into the line memory 134a. In addition, if "NO" in the step S133, steps S177 to S201 shown in FIG. 27 and FIG. 29 are executed; however, these steps are the same as the steps S151 to S175 shown in FIG. 25 and FIG. 26 except that the write flag in the steps S177, S179 and S201 is corresponding to the VRAM 120*b*, and that the processes are executed for the VRAM 120*b* in the steps S181 and S191, a duplicate description will be omitted here.

On the other hand, if "YES" in the step S131, the multiplexer 130*a* is controlled so as to select the output of the adder 132*a* as the inputted video signal is of the odd field, and thereafter, in response to a horizontal synchronization signal detected in a step S137, the line counter 114*d* is once reset and then incremented in a step S139. In addition, the horizontal synchronization signal detected in the step S137 is also a signal added to a video signal to be written into the line memory 134*a* at a front portion thereof. Succeedingly, the read enable signal is outputted to the line memory 134*a*, and just after, the write enable signal is outputted, in a step S141. Accordingly, the video signal outputted from the D—D converter 128*a* and written into the line memory 134*a* is read-out, and just after, the video signal outputted from the adder 132*a* is written into the line memory 134*a*. However, since neither the VRAM 120*a* nor 120*b* is write-enabled at this time, the video signal read-out from the line memery 134*a* is never written into the VRAM 120*a* or 120*b*.

If the process of the step S141 is completed, the data counter 114*c* is reset in a step S143, and it is determined whether or not the count value of the data counter 114*c* is equal to "180" in a step S145. Then, if "NO", the data counter 114*c* is incremented in a step S147, and the process returns back to the step S145; however, if "YES", the read disable signal and the write disable signal are outputted to the line memory 134*a* in a step S149, and the process proceeds to FIG. 29.

In a step S203 shown in FIG. 29, it is determined whether or not the most significant bit of the input terminal information applied from the output terminal P29 is "0". If "NO", the process proceeds to FIG. 31 as a video signal applied to the A/D converter 116*a* is one of the video signals Y9 to Y16. On the other hand, if "YES", a video signal applied to the A/D converter 116*a* is regarded as one of the video signals Y1 to Y8, and therefore, the write flag of the VRAM 120*a* is reset in a step S205, and set in a step S207. Next, in a step S209, the write enable signal is outputted to the VRAM 120*a* and the read enable signal is outputted to the line memory 134*a*, and thereafer, in a step S211, by comparing the input terminal information applied to the microcomputer 114 and the input terminal information stored in the RAM 114*a* with each other, an area corresponding to the input terminal information is searched, and addresses of the searched area are initialized.

Figure 32:
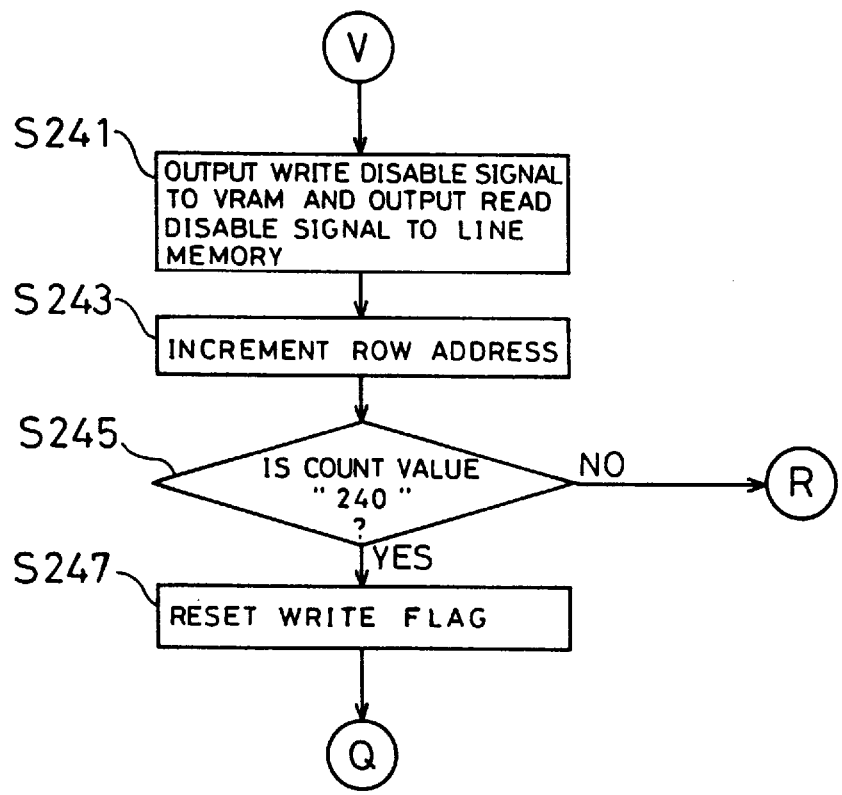
FIG. 32 is a flowchart showing a portion of the operation of FIG. 15 embodiment.

Succeedingly, the data counter 114*c* is reset in a step S123, and it is determined whether or not the count value of the data counter 114*c* is equal to "180" in a step S125. If "NO" in this step, the column address of the area searched in the step S215 and the data counter 114*c* are incremented in a step S217, and the process returns back to the step S215; however, if "YES", in a step S219, the write disable signal is outputted to the VRAM 120*a* and the read disable signal is outputted to the line memory 134*a*. Therefore, the writing of a video signal read-out from the line memory 134*a* into the VRAM 120*a* is completed. Thereafter, the row address of the area searched in the step S211 is incremented in a step S221, and it is determined whether or not the count value of the line counter 114*b* is equal to "240" in a step S223. Then, if "NO", the process returns back to the step S115, if "YES"; however, the write flag for the VRAM 120*a* is reset in a step S225, and the process returns back to the step S101. In addition, though processes of the steps S227 to S247 shown in FIG. 31 and FIG. 32 are executed in a case where "NO" is determined in the step S203, these steps are the same as the steps S205 to S225 except that the write flag is corresponding to the VRAM 120*b* in the steps S227, S229 and S247, and that processes are executed to the VRAM 120*b* in the steps S231 and S241, and therefore, a duplicate description will be omitted here.

The above described processing operation shown in FIG. 21 to FIG. 32 is for the vertical filter block 118*a* and the VRAMs 120*a* and 120*b*, and the vertical filter block 118*b* and the VRAMs 120*a* and 120*b* are processed according to the other flowcharts. However, since the processing operation for the vertical filter block 118*b* and the VRAMs 120*a* and 120*b* are approximately the same as the processing operation shown in FIG. 21 to FIG. 32, only different points will be described and a duplicate description about the same points will be omitted. The different points are that the input terminal information and a vertical synchronization signal of an video signal applied to the A/D converter 116*b* are detected in the steps S101 and S103, and that the line counter 114*d* is processed in the steps S107, S119, S139, S171 and S197, and that the data counter 114*b* is processed in the steps S123, S127, S143, S147, S159, S163, S185, S189, S213, S217, S235 and S239.

Figure 33:
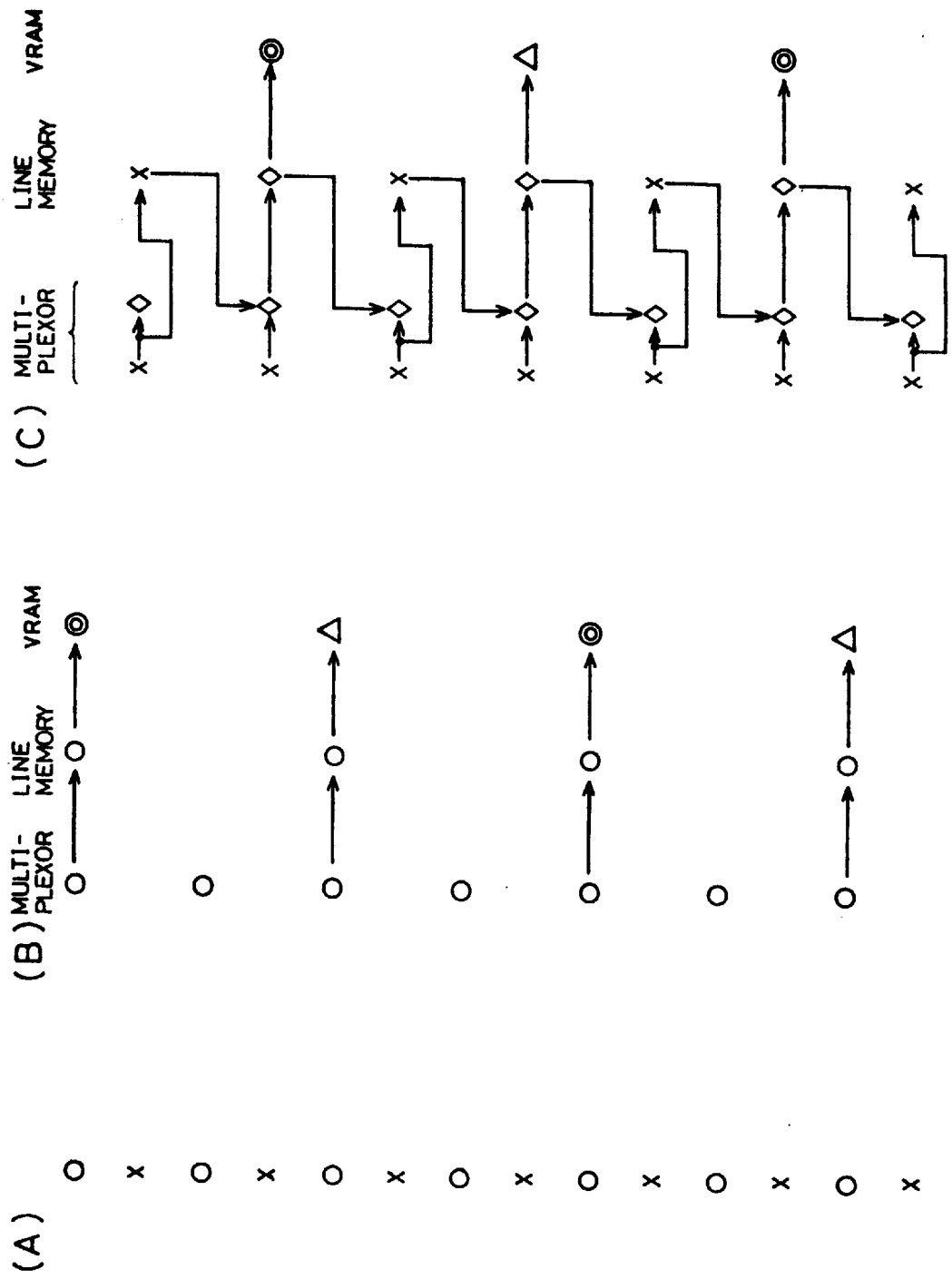
FIG. 33 is an illustrative view showing a portion of an operation of FIG. 15 embodiment.

Because of the processing operation of the microcomputer 114, when the even field of the video signal Y3 and the odd field of the video signal Y5 are sequentially applied to the vertical filter block 118*a*, for example, the video signals Y3 and Y5 are processed as shown in FIG. 33 and written into the VRAM 120*a*. That is, if the even field is represented by the symbol of ○ and the odd field is represented by the symbol of X, and an interlaced relationship is represented by FIG. 33(A). When the video signal Y3 of the even field is first applied to the vertical filter block 118*a*, the video signal Y3 is processed as shown in FIG. 33(B). More specifically, the multiplexer 130*a* selects the output of the D—D converter 128*a*, and an output of the multiplexer 130*a* is written into the line memory 134*a* at every two lines and read-out from the line memory 134*a* at every two lines. Then, the video signal Y3 read-out from the line memory 134*a* is written into the Y3 area of the VRAM 120*a*. That is, 120 lines of the video signals Y3 is written into the Y3 area.

The video signal Y3 thus stored is read-out by interlaced-scanning the VRAM 120*a*. Therefore, a video signal for one frame in the Y3 area of the monitor 126 is generated on the basis of the video signal for one field. In addition, a signal represented by the symbol of ⊙ is for an even field of the monitor 126, and a signal represented by the symbol of Δ is for an odd field. A reason why the video signal equal to one frame is thus generated on the basis of the video signal equal to one field is that writing into the VRAMs 120*a* and 120*b* by the microcomputer 114 and reading-out from the VRAMs 120*a* and 120*b* by the multiplexer 122 are independent from each other, and therefore, it is impossible to synchronize the writing and the reading with each other.

Succeedingly, when the video signal Y5 of the odd field is applied to the vertical filter block 118*a*, the video signal Y5 is processed as shown in FIG. 24(C). That is, the output (X) of the D—D converter 128*a* and the output (◇) of the adder 132 are applied to the multiplexer 132*a*, amd either one is selected alternately by the multiplexer 130*a*. Then, the output of the multiplexer 130*a* is once written into the line memory 134 and read-out from the line memory 134. However, since the write enable signal is applied to the VRAM 120*a* only when the output of the adder 132*a* is read-out from the line memory 134, the output of the adder 132*a* is written into the Y5 area of the VRAM 120*a*. At this time, the video signal Y5 of 120 lines is written into the Y5 area in above described manner.

Figure 34:
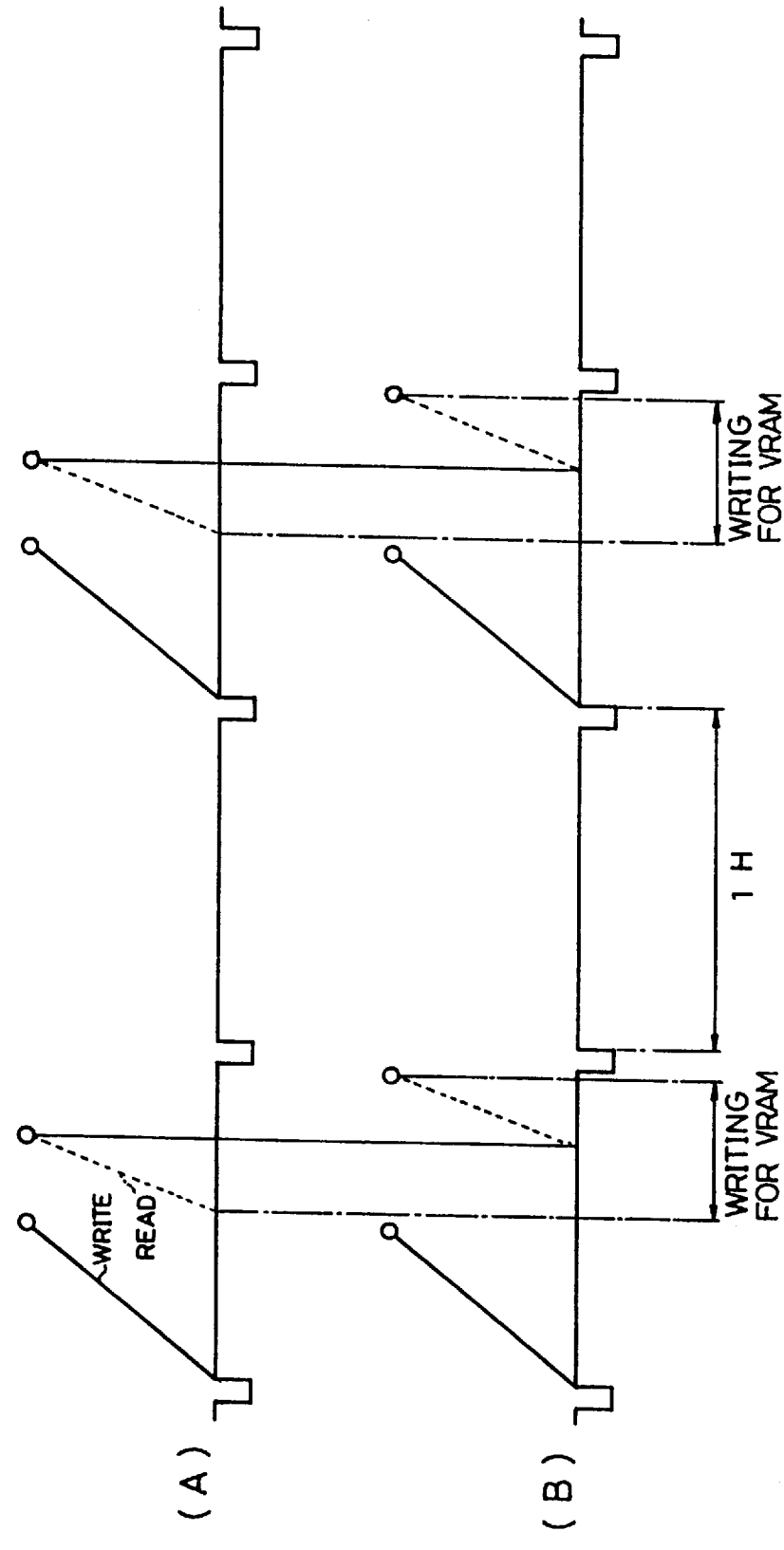
FIG. 34(A) is a timing chart showing writing and reading of a line memory 34a, and FIG. 34(B) is a timing chart showing writing and reading of a line memory 34b.
Figure 35:
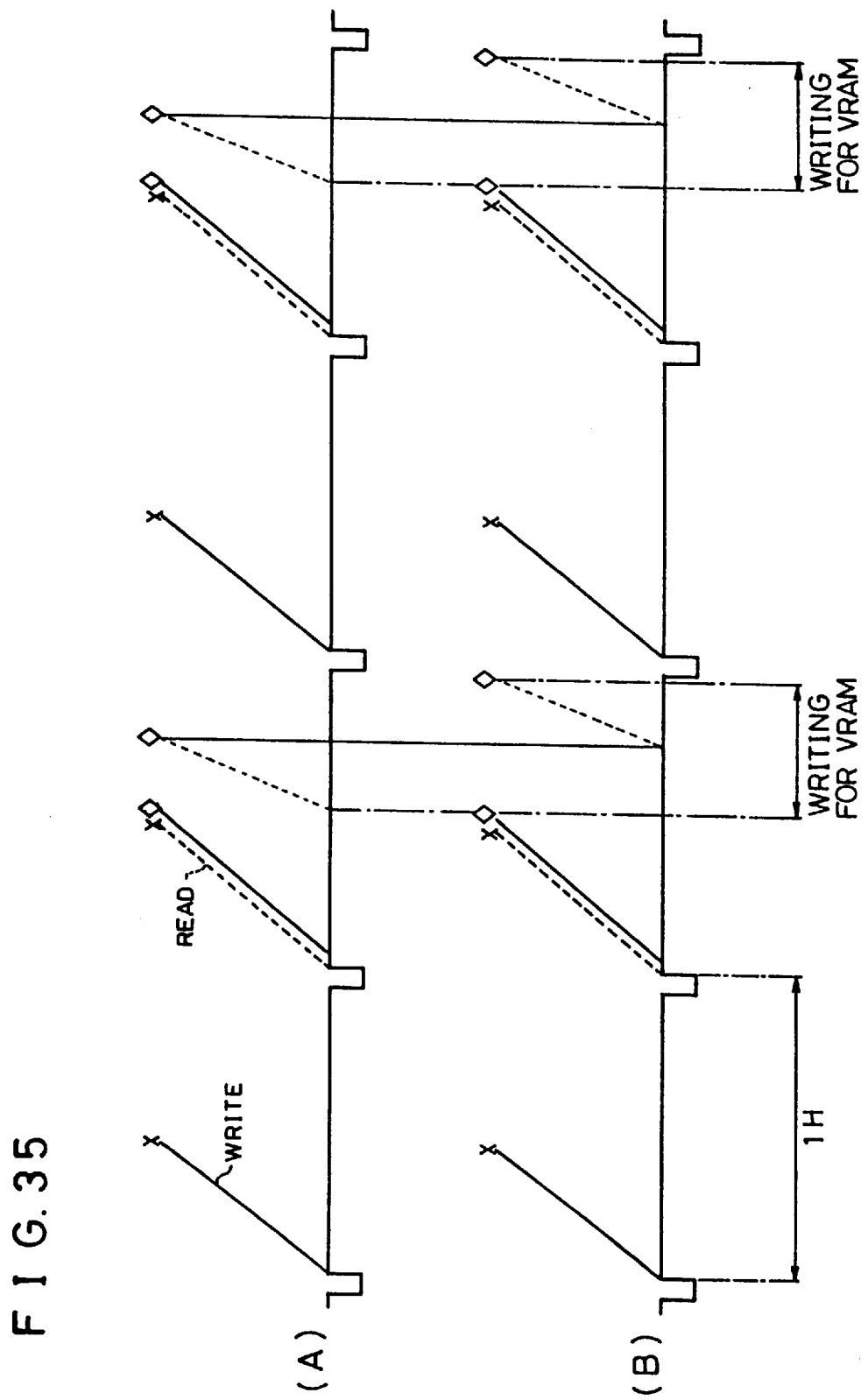
FIG. 35(A) is a timing chart showing writing and reading of the line memory 34a, and FIG. 35(B) is a timing chart showing writing and reading of the line memory 34b.
Figure 36:
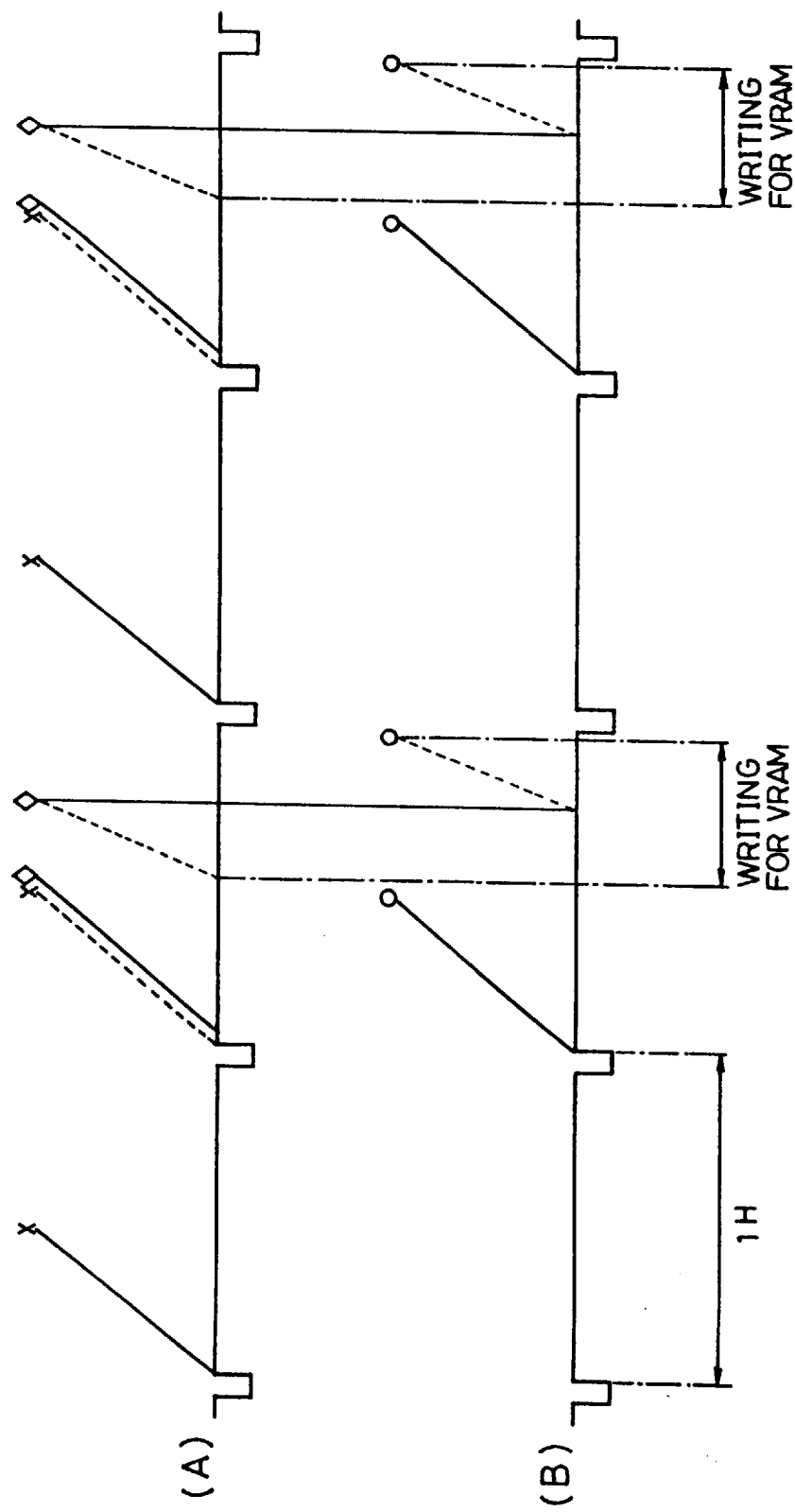
FIG. 36(A) is a timing chart showing writing and reading of the line memory 34a, and FIG. 36(B) is a timing chart showing writing and reading of the line memory 34b.

FIG. 34 to FIG. 36 are timing charts during a time that both of the video signals read-out from the line memory 134a and 134b are written into either the VRAM 120a or 120b. In addition, FIG. 34(A) to FIG. 36(A) are timing charts in the line memory 134a, and FIG. 34(B) to FIG. 36(B) are timing charts in the line memory 134b.

With referring to FIG. 34 first, the video signals of the even field are simultaneously written into the line memory 134a and 134b. Thereafter, when the write flag is set in order to write the video signal stored in the line memory 134a into the VRAM 120a, the video signal stored in the line memory 134a is read-out and written into a predetermined area of the VRAM 120a. Succedingly, when the write flag is reset, the video signal stored in the line memory 134b is read-out and written into a predetermined area of the VRAM 120a. Accordingly, a processing operation from the start of the writing the video signal into the line memories 134a and 134b to the end of the writing the video signal into the VRAM 120a is completed within 1H period. Succeedingly, after an interval of 1H period, video signals are simultaneously written into the line memories 134a and 134b again. Thereafter, as similar to the above, when the write flag is set for writing the video signal stored in the line memory 134a into the VRAM 120a, the video signal stored in the line memory 134a is first written into a predetermined area of the VRAM 120a, and when the write flag is reset, the video signal in the line memory 134b is written into a predetermined area of the VRAM 120a.

In addition, a reason why a writing period and a reading period are different from each other is that reading data is complete data without being thinning-out while writing data is data with being thinning-out at ¼. Accordingly, if a clock rate of the reading and the writing are the same, the reading period becomes a quater (½) of the writing period. In addition, though FIG. 34 to FIG. 36 show the timing charts in which the reading period is a half of the writing period, in fact, ¼ is correct.

With referring to FIG. 35, when the video signals of the even field outputted from the D—D converters 128a and 128b are simultaneously written into the line memorys 134a and 134b, both the signals are simultaneously read-out from the line memorys 134a and 134b with being delayed by a 1H period. Furthermore, at approximately the same time as the reading, the video signals outputted from the adder 132a and 132b are written into the line memorys 134a and 134b. Since it is necessary to write the video signals from the adders 132a and 132b into predetermined areas of the VRAMs 120a and 120b, video signals read-out from one of the line memory 134a or 134b are written into the VRAM 120a or 120b, and thereafter, video signals read-out from the other of the line memory 134a or 134b are written into the VRAM 120a or 120b. Therefore, the writing of the video signals outputted from the adders 132a and 132b into the line memories 134a and 134b, and the reading of the video signals from the line memories 134a and 134b, that is, the writing of the video signals into the VRAMs 120a and 120b are both completed within a 1H period.

With referring to FIG. 36, an operation during a time that the video signal of the odd field is applied to the line memory 134a while the video signal of the even field is applied to the line memory 134b will be described. In a case where the writing of the video signal of the odd field outputted from the adder 132a into the line memory 134a and the writing of the video signal of the even field outputted from the D—D converter 128b into the line memory 134b are executed at the same time, if the write flag for the VRAM 120a is set for writing the video signal of the odd field, the video signal of the odd field is first read-out from the line memory 134a and, written into a predetermined area of the VRAM 120a. Then, waiting for a reset of the write flag, the video signal of the even field is read-out from the line memory 134b and written into a predetermined area of the VRAM 120a. Succeedingly, when the video signal of the even field outputted from the D—D converter 128a is written into the line memory 134a for the next 1H period, no signal is written into the line memory 134b. Then, the video signal of the odd field stored in the line memory 134a is read-out just before the video signal of the odd field outputted from the adder 132a is written into the line memory 134a. Thus, when both of the video signals outputted from the vertical filter blocks 118a and 118d are written into the same VRAM 120a or 120b, the writing of one of the video signals is performed prior to the writing of the other of the video signals.

In an operation, the video signals Y1 and Y2 are outputted from the output terminals P27 and P28 of the multiplexer 112 for the beginning 53 field period and written into the Y1 area and the Y2 area of the VRAM 120a via the vertical filter blocks 118a and 118b. Thereafter, the video signals Y3 and Y4, Y5 and Y6, . . . , Y15 and Y16 are outputted from the output terminal P27 and P28 at every one field and written into the predetermined area of the VRAMs 120a or 120b. Accordingly, the Y1 area and the Y2 area are succeedingly renewed at fifty three (53) times with intervals of seven (7) fields, and each of the Y3 area to Y16 area is renewed at every sixty (60) fields. The VRAMs 120a and 120b are interlaced-scanned by the multiplexer 122, and the video signals Y1 to Y16 read-out by the system are outputted on the monitor 126. Accordingly, images of the Y1 area and the Y2 area of the monitor 126 are almost normal moving images, however, images of the Y3 area to Y16 area become strobe images.

According to the above described embodiment, the video signals Y1 to Y16 are outputted from the output terminals P27 and P28, and the video signals outputted from the vertical filter blocks 118a and 128b are applied to the VRAMs 120a and 120b. Accordingly, it is possible to freely select images to be renewed on the monitor 126 by arbitrarily selecting the video signals by the multiplexer 112.

In addition, though the video signals Y1 and Y2 are successively outputted from the multiplexer 112 for fifty three (53) fields period, and thereafter, the video signals Y3 to Y16 are outputted for remaining seven (7) fields period two by two, it is, of course, possible to apply the invention in a case where the video signals Y1 to Y16 are outputted with any combination or in any order.

Figure 37:
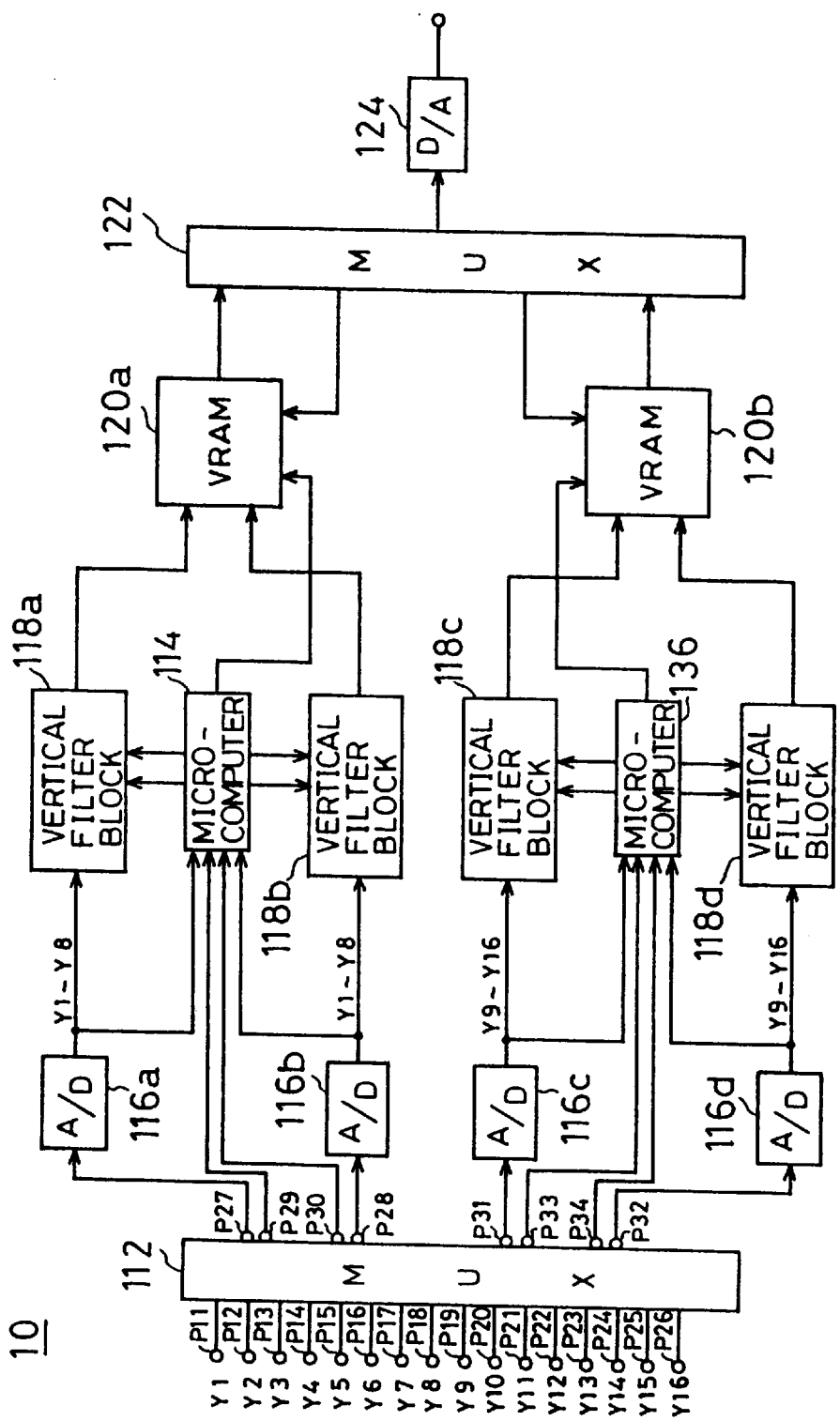
FIG. 37 is a block diagram showing another embodiment according to the other invention.
Figure 38:
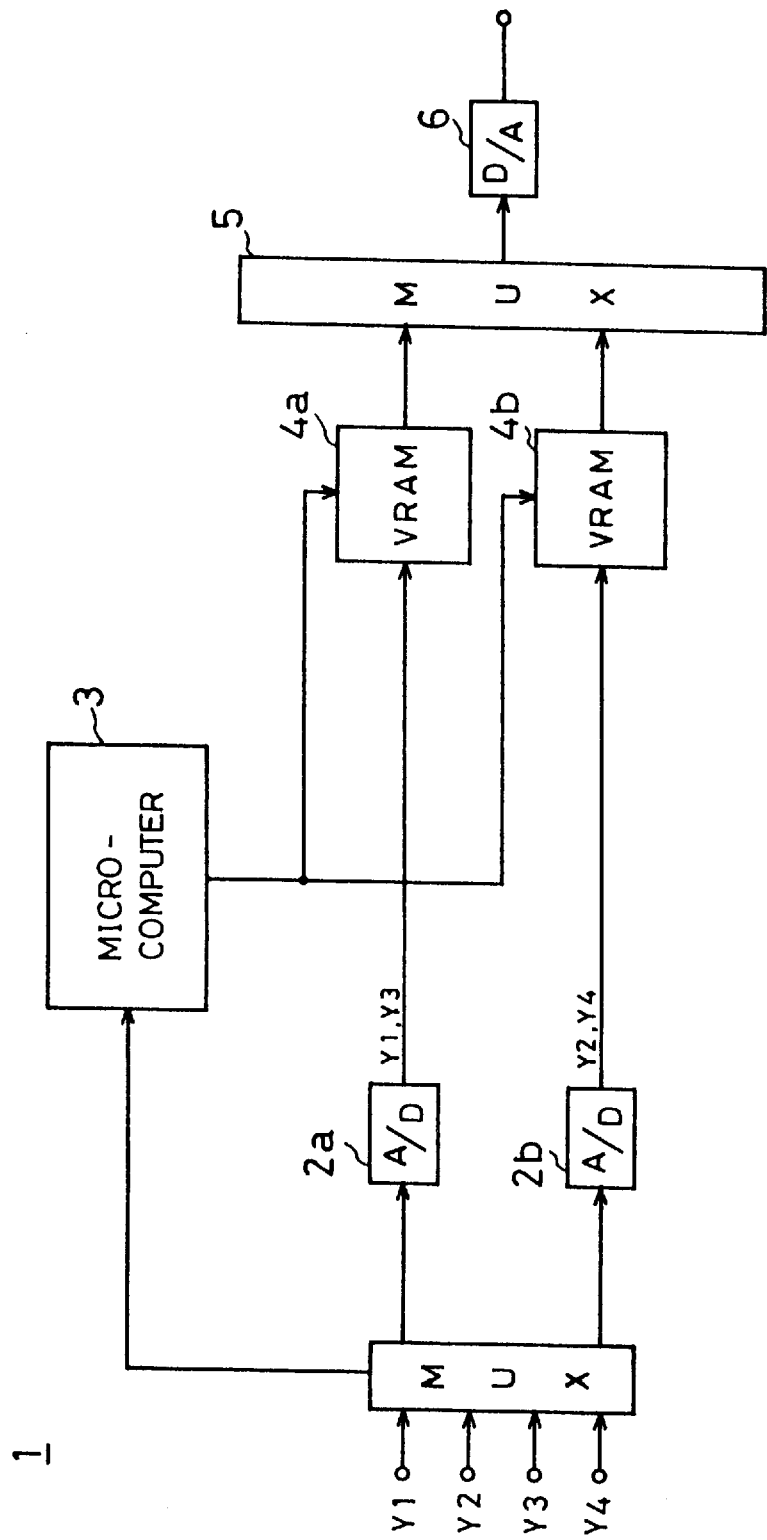
FIG. 38 is a block diagram showing a prior art.
Figure 39:
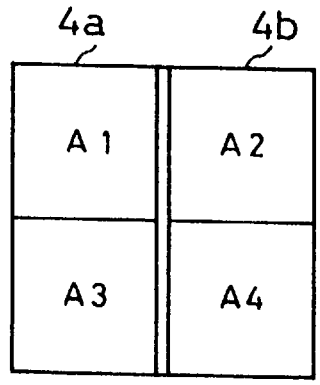
FIG. 39 is an illustrative views showing a portion of FIG. 38 prior art.
Figure 40:
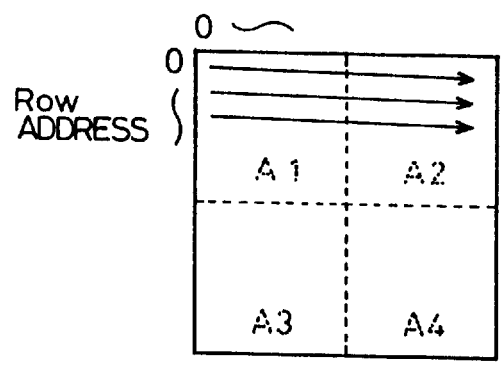
FIG. 40 is an illustrative views showing a portion of FIG. 38 prior art.
Figure 41:
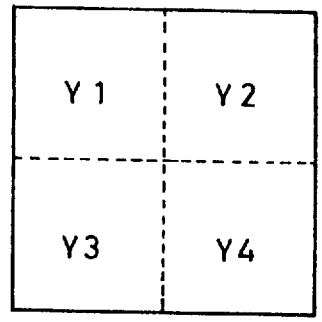
FIG. 41 is an illustrative views showing a portion of FIG. 38 prior art.
Figure 42:
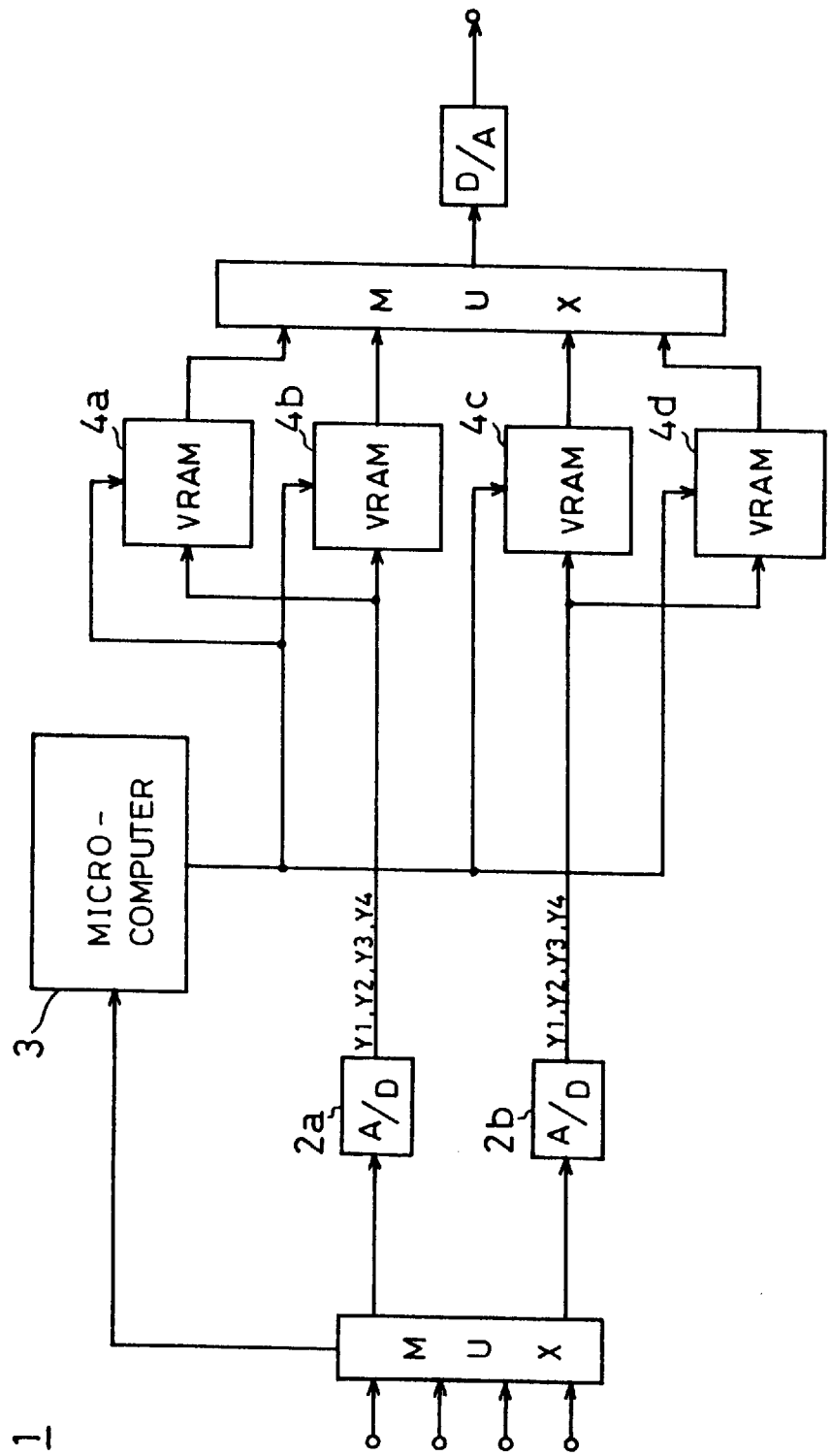
FIG. 42 is a block diagram showing another prior art.
Figure 44A:
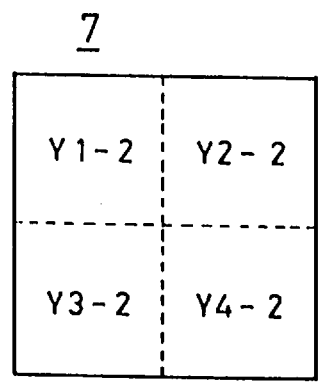
FIG. 44(A) and (B) are illustrative views showing images displayed on a monitor.
Figure 44B:
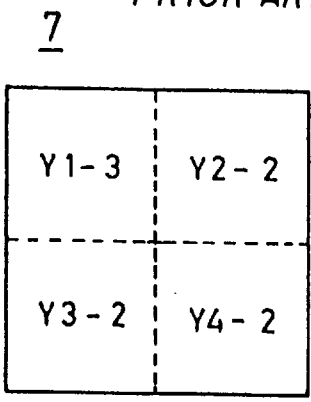
Figure 45:
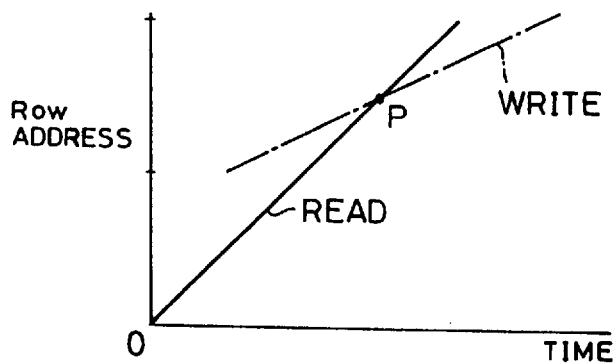
FIG. 45 is a graph showing reading speed and writing speed.
Figure 46:
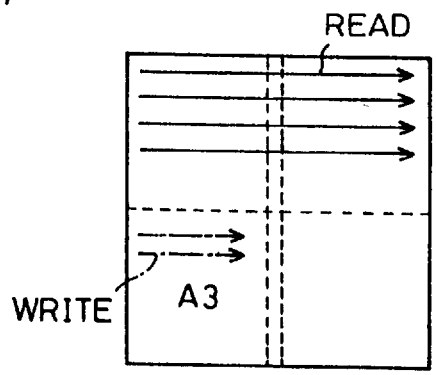
FIG. 46 and FIG. 47 are illustrative views showing portions of FIG. 42 prior art.
Figure 47:
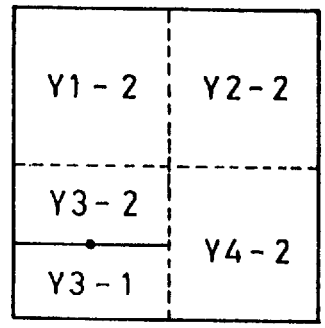

Furthermore, it is possible to renew two images in the Y1 area to the Y8 area and two images in the Y10 area to the Y16 area within one field period in a case where A/D converters 116c and 116d, vertical filter blocks 118c and 118d and a microcomputer 136 are newly provided, and the video signals Y1 to Y8 are outputted from output terminals P27 and P28 of a multiplexer 112 and the video signals Y9 to Y16 are outputted from output terminals P31 and P32 of the multiplexer 112, and outputs of vertical filter blocks 118a and 118b are applied to only a VRAM 120a and outputs of vertical filter blocks 118c and 118d are applied to only a VRAM 120b, as shown in FIG. 37.

Moreover, though the embodiment shown in FIG. 1 includes two A/D converters and two vertical filter blocks; however, it is, of course, possible to increase a number of images renewed within one field period if the number of the A/D converters and the vertical filter blocks are increased and all the vertical filter blocks and the VRAMs are controlled by one microcomputer. In such a case, however, it is necessary to increase a reading speed of a line memory and a writing speed of the VRAMs in response to the number of the A/D converters and the vertical filter blocks.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video signal outputting method, comprising steps of:
   (a) providing N+1 of memory means each of which stores at least one of N kinds of video signals;
   (b) selecting a first kind of video signal from said N kinds of video signals in a predetermined order;
   (c) writing a selected video signal into one memory means of two memory means into which a second kind of video signals have been written, said one memory means has been previously written with the second kind of video signal prior to another memory means of said two memory means has been written with the second kind of video signal, wherein said second kind of video signals are the same kind of video signals, but differ from said selected video signal;
   (d) simultaneously reading N kinds of video signals from N of memory means into which no video signals are being written; and
   (e) outputting said N kinds of video signals to N of display means, respectively.

2. A video signal outputting method according to claim 1, further comprising a step of (f) providing flags corresponding to said N+1 of memory means, wherein said step (b) includes steps of:
   (b-1) writing a video signal selected at this time into a memory means that a flag is reset in said two memory means;
   (b-2) setting a flag of a memory means that writing is executed at this time in said two memory means; and
   (b-3) resetting a flag of a memory means that no writing is executed at this time.

3. A video signal outputting method according to claim 2, wherein said step (d) includes a step of (d-1) reading video signals out of N of memory means which said flags are set.

4. A video signal outputting apparatus, comprising:
   N+1 of memory means each of which stores at least one of N kinds of video signals;
   a selecting means for selecting a first kind of video signal from said N kinds of video signals in a predetermined order;
   a writing means for writing a selected video signal into one memory means of two memory means into which a second kind of video signals have been written, said one memory means has been previously written with the second kind of video signal prior to another memory means of said two memory means has been written with the second kind of video signal, wherein said second kind of video signals are the same kind of video signals, but differ from said selected video signal;
   a reading means for simultaneously reading-out N kinds of video signals from N of memory means into which no video signals are being written; and
   an outputting means for outputting said N kinds of video signals as read to N of display means, respectively.

5. A video signal outputting apparatus, comprising:
   a video memory having N areas;
   a first selecting means for selecting $M(2 \leq M \leq N)$ kinds of first video signals from N kinds of first video signals with predetermined combination;
   M of signal generating means which generate M kinds of second video signals for outputting from predetermined areas of said video memory on the basis of said M kinds of first video signals;
   a first writing means for writing said M kinds of second video signals into said predetermined areas respectively;
   a first reading means for reading-out N kinds of second video signals from said video memory;
   an outputting means for outputting said N kinds of second video signals as read to N of display means, respectively, wherein said signal generating means includes a data thinning means for thinning-out in horizontal pixel data included in said first video signal with first predetermined intervals; and
   a video signal generating means for generating a fourth video signal that horizontal lines are thinned-out with second predetermined intervals on the basis of a third video signal that said horizontal pixel data is thinned-out and a frequency of said horizontal pixel data is converted in accordance with said first predetermined intervals, and outputting said fourth video signal as said second video signal.

6. A video signal outputting apparatus according to claim 5, wherein each of said N kinds of video signals is an video signal of either a first field or a second field, said video signal generating means includes a weighting means for generating a weighted signal by waiting a plurality of lines of said third video signal;
   a selecting means for selecting said third video signal during a time that said third video signal is said first field and selecting said weighted signal during a time that said third video signal is said second field;
   a line memory for storing an output of said selecting means;
   a second writing means for writing said output of said selecting means into said line memory at said second predetermined intervals; and
   a second reading means for reading-out said output of said selecting means stored in said line memory.

* * * * *